US012668280B1

(12) United States Patent
Roales et al.

(10) Patent No.: US 12,668,280 B1
(45) Date of Patent: Jun. 30, 2026

(54) DISPLAYING UPDATED VEHICLE BEHAVIOR IN REAL TIME VISUALIZATIONS

(71) Applicant: WAYMO LLC, Mountain View, CA (US)

(72) Inventors: Paul Roales, Mountain View, CA (US); Shir Yehoshua, San Francisco, CA (US); Franklin Morley, East Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 584 days.

(21) Appl. No.: 17/527,347

(22) Filed: Nov. 16, 2021

Related U.S. Application Data

(63) Continuation-in-part of application No. 17/477,692, filed on Sep. 17, 2021.

(51) Int. Cl.
B60W 60/00 (2020.01)
B60W 50/14 (2020.01)
(Continued)

(52) U.S. Cl.
CPC ........ B60W 60/0027 (2020.02); B60W 50/14 (2013.01); G06F 3/04842 (2013.01); (Continued)

(58) Field of Classification Search
None
See application file for complete search history.

(56) References Cited

U.S. PATENT DOCUMENTS 8,234,631 B2 7/2012 Greifeneder et al.
9,721,204 B2 8/2017 Campos et al.
(Continued)

OTHER PUBLICATIONS

Fremont, Daniel J., et al., "Formal Scenario-Based Testing of Autonomous Vehicles: From Simulation to the Real World", arXiv:2003.07739v2 [eess.SY] Jul. 12, 2020, pp. 1-9.
(Continued)

Primary Examiner — Angela Y Ortiz
Assistant Examiner — Torrence S Marunda, II
(74) Attorney, Agent, or Firm — Botos Churchill IP Law LLP

(57) ABSTRACT

Aspects of the technology employs snapshots, which are serialized sets of inputs for evaluating a components of a vehicle's autonomous driving system. Snapshots can be performed very quickly with minimal compile latency and runtime, allowing rapid evaluation of individual autonomous vehicle elements in isolation. Parameter variation and changes to initial conditions associated with a given component may be applied via a robust user interface (UI), enabling a user to perform permutations to a component or scenario and receive immediate feedback, e.g., graphically presented in a three-dimensional (3D) scene to understand how the vehicle is operating. The UI may include various control elements to enable real-time adjustment to the parameters or conditions of a snapshot. This can include one or more mutations of a snapshot to evaluate different situations or conditions, which can further aid in understanding how the vehicle would function in an autonomous driving mode.

17 Claims, 19 Drawing Sheets

1300    1302 ⌐ Retrieving a snapshot from a database, in which the snapshot includes a set of state information that is a minimal amount of information needed to recreate an action or a state of the component at a particular point in time when operating in the autonomous driving mode, and wherein at least a portion of the state information has been serialized 1304 ⌐ Performing a deserializing operation on the serialized portion of the state information 1306 ⌐ Receiving user input indicating a request to visualize the snapshot, the request including at least one of selection of the snapshot, mutating a feature of the snapshot, or toggling between versions of the snapshot 1308 ⌐ In response to the request, performing an evaluation of the snapshot to identify either the state of the component or an output of the component at the particular point in time 1310 ⌐ Generating, for display on a display device, a visualization of the snapshot as the evaluation is being performed, the visualization indicating the state of the component or the output of the component at the particular point in time

(51) Int. Cl.

| | |
|---|---|
| *G06F 3/04842* | (2022.01) |
| *G06F 3/04847* | (2022.01) |
| *G06F 16/11* | (2019.01) |

(52) U.S. Cl.

CPC ........ *G06F 3/04847* (2013.01); *G06F 16/128* (2019.01); *B60W 2050/146* (2013.01); *B60W 2420/403* (2013.01); *B60W 2540/215* (2020.02); *B60W 2554/4041* (2020.02); *B60W 2554/4045* (2020.02)

(56) References Cited

U.S. PATENT DOCUMENTS

| | | | | |
|---|---|---|---|---|
| 9,870,629 | B2 | 1/2018 | Cardno et al. | |
| 10,147,210 | B1 | 12/2018 | Desai et al. | |
| 10,173,673 | B1 | 1/2019 | Ferguson et al. | |
| 10,345,811 | B2 | 7/2019 | Phillips et al. | |
| 10,673,942 | B2 * | 6/2020 | Illowsky | G06F 21/445 |
| 10,861,257 | B1 | 12/2020 | Harris et al. | |
| 10,868,714 | B2 | 12/2020 | Plache | |
| 10,977,272 | B2 | 4/2021 | Nadler | |
| 11,150,660 | B1 | 10/2021 | Kabirzadeh et al. | |
| 11,644,834 | B2 * | 5/2023 | Ditty | G06V 20/58 |
| | | | | 701/23 |
| 2010/0097878 | A1 | 4/2010 | Johnson | |
| 2019/0220549 | A1 * | 7/2019 | Ide | G06F 8/71 |
| 2019/0236950 | A1 * | 8/2019 | Li | G08G 1/096741 |
| 2019/0250611 | A1 * | 8/2019 | Costin | G05D 1/0257 |
| 2020/0086855 | A1 | 3/2020 | Packer et al. | |
| 2020/0097004 | A1 | 3/2020 | Whittaker et al. | |
| 2020/0327130 | A1 | 10/2020 | Ghazaleh | |
| 2020/0349234 | A1 | 11/2020 | Hofer et al. | |
| 2021/0053561 | A1 | 2/2021 | Beller et al. | |
| 2021/0055733 | A1 | 2/2021 | Beller et al. | |
| 2021/0237772 | A1 * | 8/2021 | Meltz | G06F 30/20 |
| 2022/0126831 | A1 | 4/2022 | Foil et al. | |
| 2022/0309341 | A1 | 9/2022 | Brox et al. | |
| 2022/0417472 | A1 | 12/2022 | Mobbs | |
| 2023/0289281 | A1 | 9/2023 | Redford et al. | |

OTHER PUBLICATIONS

Han, Jia Cheng , et al., "Metamorphic Fuzz Testing of Autonomous Vehicles", ResearchGate, https://www.researchgate.net/publication/340486704, 2020, pp. 1-7.

Hawkins, Andrew J., "Welcome To Simulation City, the Virtual World Wherewaymo Tests Its Autonomous Vehicles", Welcome to Simulation City, the virtual world where Waymo tests its autonomous vehicles—The Verge, https://www.theverge.com/2021/7/6/22565448/waymo-simulation-city-autonomous-vehicle-testing-virtual, Jul. 6, 2021, pp. 1-7.

Hu, Zhisheng , et al., "Coverage-based Scene Fuzzing for Virtual Autonomous Driving Testing", arXiv:2106.00873v1 [cs.AI] Jun. 2, 2021, pp. 1-8.

Li, Abner , "Waymo details 'Carcraft' simulation software, 'Castle' testing site for self-driving car training", Waymo details 'Carcraft' simulation software, 'Castle' testing site for self-driving car training—9to5Google, 2017, pp. 1-10.

Neves, Nania, et al., "Automated Structural Software Testing of Autonomous Vehicles", ResearchGate, https://www.researchgate.net/publication/334387608, 2019, pp. 1-15.

Shan, Lijun , et al., "Generating Structurally Complex Test Cases By Data Mutation: A Case Study Of Testing An Automated Modelling Tool", The Computer Journal Advance Access published Jun. 28, 2007, pp. 1-19.

Wiggers, Kyle , "Waymo is using AI to simulate autonomous vehicle camera data", Waymo is using AI to simulate autonomous vehicle camera data | VentureBeat, https://venturebeat.com/2020/05/20/waymo-is-using-ai-to-simulate-autonomous-vehicle-camera-data/, May 20, 2020, pp. 1-9.

Woodlief, Trey , et al., "Fuzzing Mobile Robot Environments for Fast and Automated Crash Detection", 2021, pp. 1-7.

Zhou, Zhi Q, et al., "Metamorphic Testing of Driverless Cars", University of Wollongong, Faculty of Engineering and Information Sciences, 2019, pp. 1-12.

Bags—ROS Wiki, Open Robotics, www.openrobotics.org, retrieved May 17, 2021, pp. 1-2.

Chen, Min, et al, Task-Oriented Synergistic Multimodality, Graphics Lab, Dept. of Computer Science, Peking University, Beijing, P.R. China, 1996, pp. 1-4.

Ezenwoye, Onyeka, et al, TRAP/BPEL: A Framework for Dynamic Adaptation of Composite Services, Technical Report: FIU-SCIS, 2007, Autonomic Computing Research Laboratory, School of Computing and Information Services, Florida International Univ. 17 pp.

Jahani, Eaman, et al, Automatic Optimization for MapReduce Programs, University of Michigan, Ann Arbor, MI, 2011, pp. 385-396.

Goberville, Nick, et al., "Analysis of LIDAR and Camera Data in Real-World Weather Conditions for Autonomous Vehicle Operations", SAE International, Apr. 14, 2020, pp. 1-7.

Mccall, Roderick , et al., "Towards A Taxonomy of Autonomous Vehicle Handover Situations", Proceedings of the 8th International Conference on Automotive User Interfaces and Interactive Vehicular Applications, 2016, pp. 194-200.

Weon, Esther S, "Webviz: An open Source Platform for Robotics Data Visualization", How Cruise visualizes autonomous vehicle data in the browser, https://medium.com/cruise/webviz-fb5f77ebe52b, 2019, pp. 1-7.

* cited by examiner

100

150

102

106a

106b

104

200

300

400

Trigger snapshot — 402

Publish snapshot — 404

Clean up information — 406

Serialize selected parts of the information — 408

Centralized storage of the snapshot — 410

Retrieve selected snapshot — 412

Deserialize selected snapshot — 414

Fig. 5          500
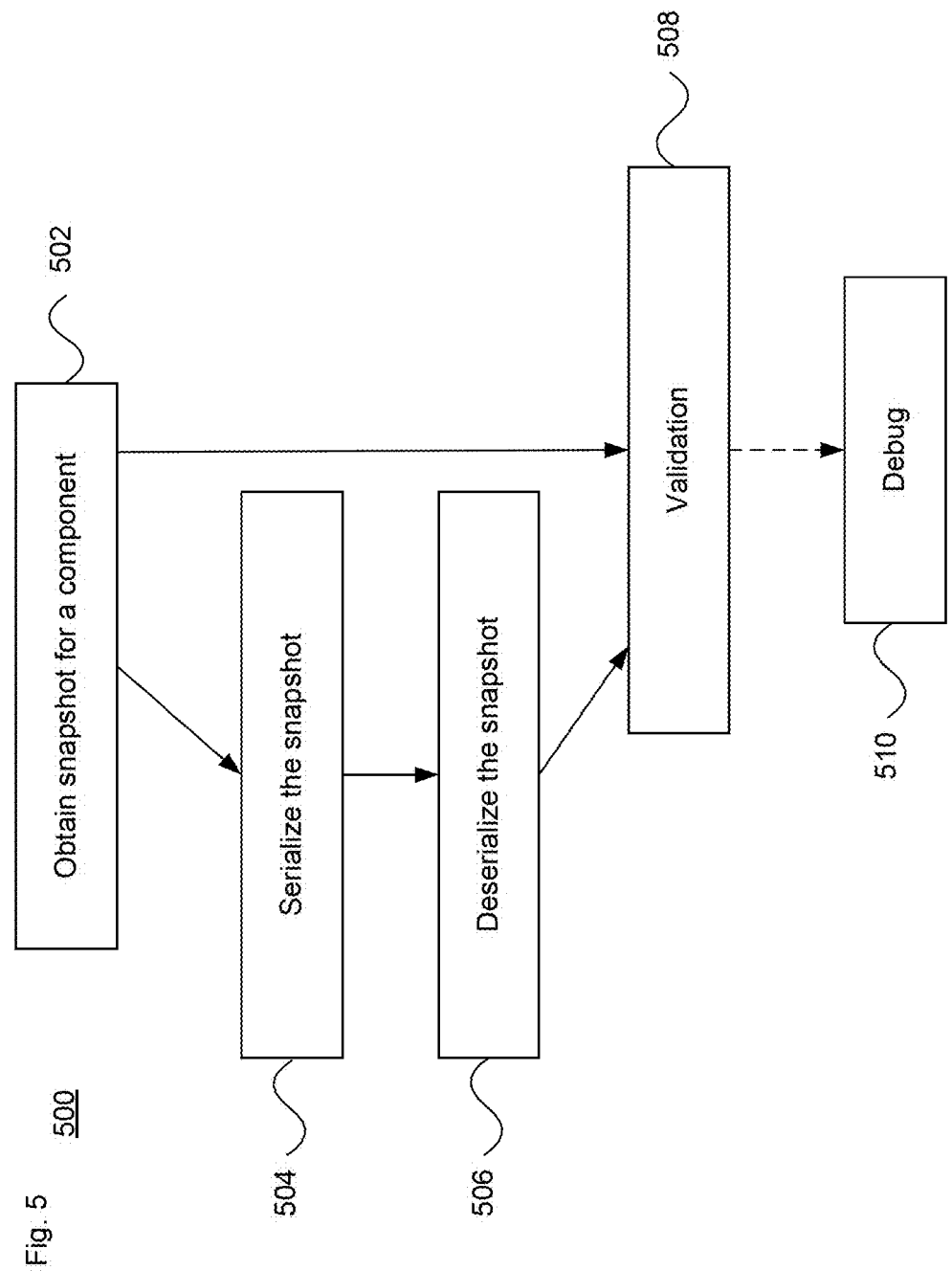

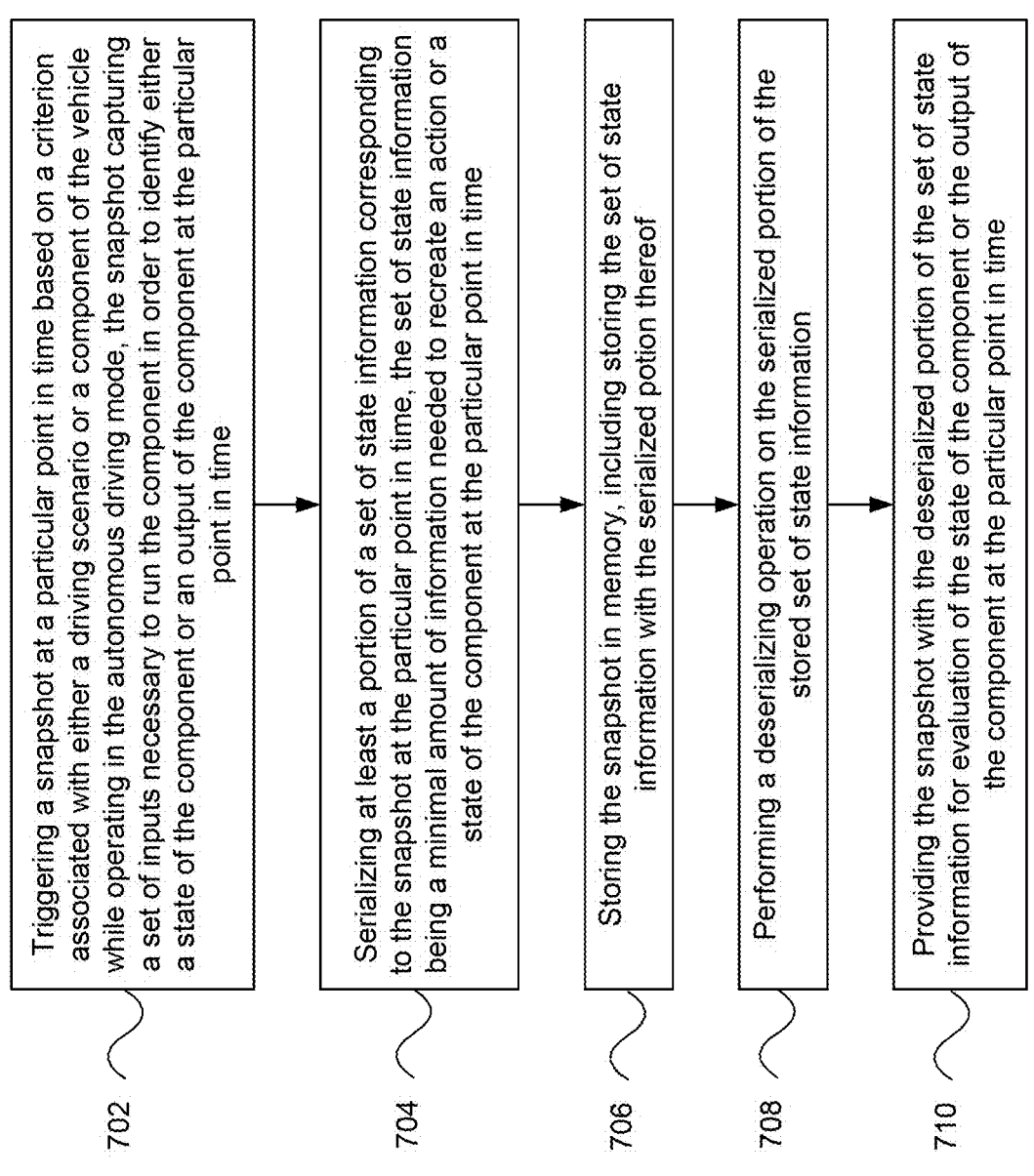

702 — Triggering a snapshot at a particular point in time based on a criterion associated with either a driving scenario or a component of the vehicle while operating in the autonomous driving mode, the snapshot capturing a set of inputs necessary to run the component in order to identify either a state of the component or an output of the component at the particular point in time 704 — Serializing at least a portion of a set of state information corresponding to the snapshot at the particular point in time, the set of state information being a minimal amount of information needed to recreate an action or a state of the component at the particular point in time 706 — Storing the snapshot in memory, including storing the set of state information with the serialized potion thereof 708 — Performing a deserializing operation on the serialized portion of the stored set of state information 710 — Providing the snapshot with the deserialized portion of the set of state information for evaluation of the state of the component or the output of the component at the particular point in time

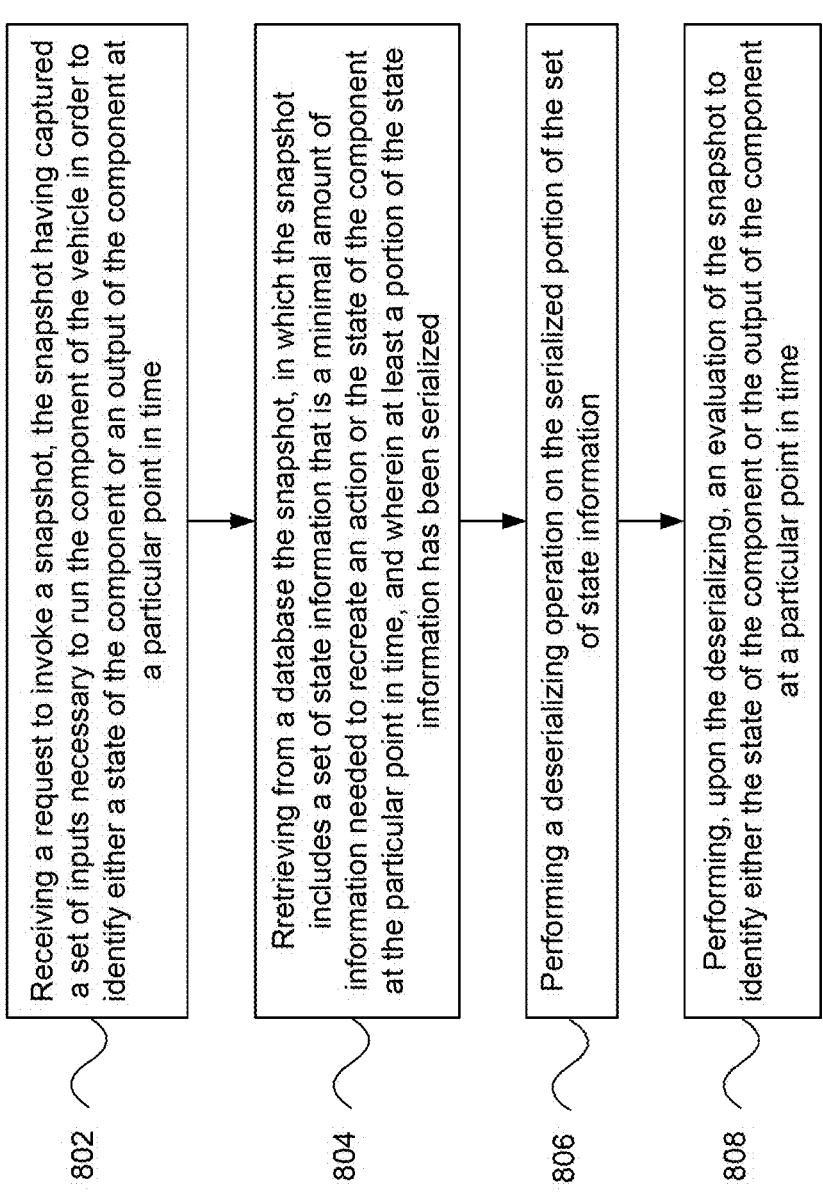

802  Receiving a request to invoke a snapshot, the snapshot having captured a set of inputs necessary to run the component of the vehicle in order to identify either a state of the component or an output of the component at a particular point in time 804  Rretrieving from a database the snapshot, in which the snapshot includes a set of state information that is a minimal amount of information needed to recreate an action or the state of the component at the particular point in time, and wherein at least a portion of the state information has been serialized 806  Performing a deserializing operation on the serialized portion of the set of state information 808  Performing, upon the deserializing, an evaluation of the snapshot to identify either the state of the component or the output of the component at a particular point in time

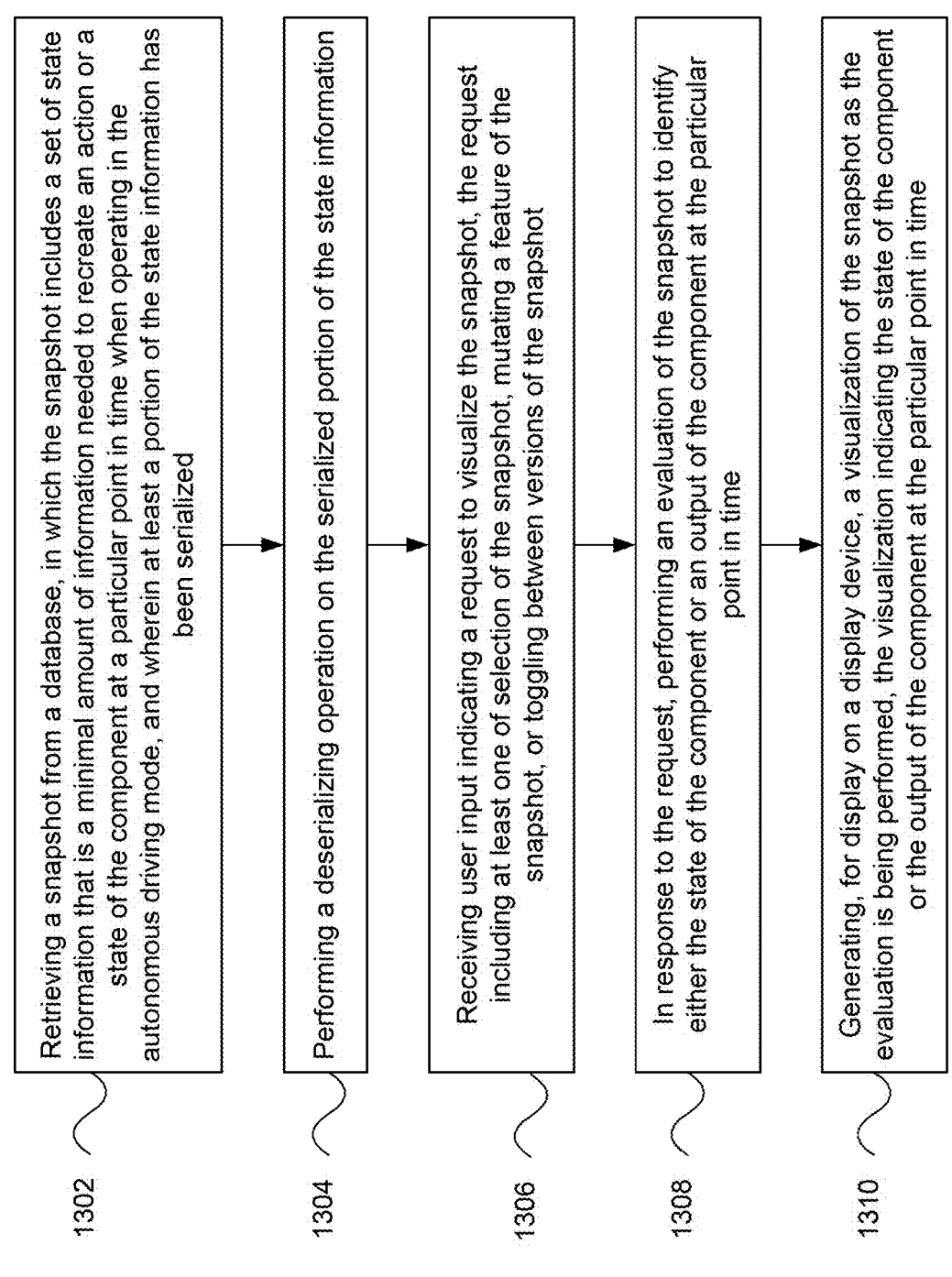

1302 — Retrieving a snapshot from a database, in which the snapshot includes a set of state information that is a minimal amount of information needed to recreate an action or a state of the component at a particular point in time when operating in the autonomous driving mode, and wherein at least a portion of the state information has been serialized 1304 — Performing a deserializing operation on the serialized portion of the state information 1306 — Receiving user input indicating a request to visualize the snapshot, the request including at least one of selection of the snapshot, mutating a feature of the snapshot, or toggling between versions of the snapshot 1308 — In response to the request, performing an evaluation of the snapshot to identify either the state of the component or an output of component at the particular point in time 1310 — Generating, for display on a display device, a visualization of the snapshot as the evaluation is being performed, the visualization indicating the state of the component or the output of the component at the particular point in time

DISPLAYING UPDATED VEHICLE BEHAVIOR IN REAL TIME VISUALIZATIONS

CROSS-REFERENCE TO RELATED APPLICATIONS

This application is a continuation-in-part of U.S. application Ser. No. 17/477,692, filed Sep. 17, 2021, the entire disclosure of which is incorporated by reference herein.

BACKGROUND

Autonomous or self-driving vehicles, in particular vehicles that do not require a human driver, can be used to transport passengers or items from one location to another. Such vehicles may operate in a fully autonomous mode without a person providing driving input under some or all driving conditions. In this type of driving mode, the vehicle may make all of the driving decisions and monitor the driving environment. This may be done by one or more modules or other components of the vehicle's on-board processing system.

In order to ensure correct decisions are made or that the components otherwise operate as intended, simulations may be run across many iterations based on an initial set of conditions. However, simulations for different scenarios or unit tests may require minutes or hours of runtime and require significant amounts of data about the initial conditions. Depending upon what is being simulated, it can also be difficult to evaluate whether particular components are acting as intended or isolate why a small change in a scenario results in a significant change in system performance. Rewriting code and re-running simulations can be costly in terms of compute cycles and the work required by human evaluators. It may also be challenging to clearly understand why the system is performing differently when there are many variables that can affect the performance.

BRIEF SUMMARY

In view of the concerns with conventional system evaluation, the technology employs snapshots, which are serialized sets of inputs that are needed to evaluate a component or subcomponent of a vehicle's autonomous driving system. Any state internal to the given component (or subcomponent) is serialized properly into the snapshot, and deserialized appropriately when running the given component (or subcomponent). Snapshots can be performed very quickly with minimal compile latency and runtime (e.g., on the order of tens of seconds), allowing rapid evaluation of individual elements in isolation. Varying of parameters or other information in the snapshot can be done rapidly, enabling robust testing of particular scenarios (e.g., an unprotected turn or a rare driving situation).

Parameter variation and changes to initial conditions may be applied via a robust user interface (UI). This allows a user to perform permutations to a component or scenario and receive immediate feedback, which can be presented graphically in a three-dimensional (3D) scene to see how the vehicle is operating. The UI may include various control elements to enable real-time adjustment to the parameters or conditions of a snapshot.

According to one aspect, a method is provided for evaluating a component of a vehicle configured to operate in an autonomous driving mode, the method comprising: retrieving a snapshot from a database, in which the snapshot includes a set of state information that is a minimal amount of information needed to recreate an action or a state of the component at a particular point in time when operating in the autonomous driving mode, and wherein at least a portion of the state information has been serialized; performing, by one or more processors, a deserializing operation on the serialized portion of the state information; receiving, by the one or more processors, user input indicating a request to visualize the snapshot, the request including at least one of selection of the snapshot, mutating a feature of the snapshot, or toggling between versions of the snapshot; in response to the request, performing by the one or more processors an evaluation of the snapshot to identify either the state of the component or an output of the component at the particular point in time; and generating, for display on a display device, a visualization of the snapshot as the evaluation is being performed, the visualization indicating the state of the component or the output of the component at the particular point in time.

In one example, performing the evaluation includes initializing internal structures of the component so that they are equivalent to how the structures were when the snapshot was taken. The internal structures may be initialized based on one or more cached resources maintained separate from the snapshot. The one or more cached resources may include at least one of a roadgraph, a machine learning model, or an output from another component of the vehicle.

In another example, the user input includes mutating the feature of the snapshot, and performing the evaluation includes initializing internal structures of the component in accordance with mutating the feature. Mutating the feature may include either adding or removing an object in an environment of the vehicle. Mutating the feature may include modifying a property of an object in an environment of the vehicle. Mutating the feature may include modulating a tuning parameter associated with operating the vehicle in the autonomous driving mode. Mutating the feature may include modifying one or more aspects of a behavior prediction for an agent, the one or more aspects including at least one of state positions of the agent or a behavior prediction likelihood. The behavior prediction may be a behavior prediction that is conditional to a future action. Alternatively or additionally, mutating the feature includes selecting a target reference path.

Performing the evaluation may include analyzing any flags specified at runtime for the snapshot. The method may further comprise, in response to the user input, performing a toggle operation between two or more versions of the snapshot. Alternatively or additionally, the method may further comprise storing the visualization of the snapshot in the database. Alternatively or additionally, the method further comprises, in response to the user input, generating a set of mutated snapshots, each mutated snapshot in the set having a different group of features.

According to another aspect of the technology, a processing system is provided. The processing system includes memory and one or more processors. The memory is configured to store a snapshot associated with operation of a in an autonomous driving mode, in which the snapshot captures a set of inputs necessary to run a component of a vehicle in order to identify either a state of the component or an output of the component at a particular point in time. The one or more processors are operatively coupled to the memory. The one or more processors are configured to: retrieve the snapshot from the memory, in which the snapshot includes a set of state information that is a minimal amount of information needed to recreate an action or the state of the component at the particular point in time, and wherein at least a portion of the state information has been serialized; perform a deserializing operation on the serialized portion of the state information; receive user input indicating a request to visualize the snapshot, the request including at least one of selection of the snapshot, mutating a feature of the snapshot, or toggling between versions of the snapshot; in response to the request, perform an evaluation of the snapshot to identify either the state of the component or the output of the component at the particular point in time; and generate, for display on a display device, a visualization of the snapshot as the evaluation is being performed, the visualization indicating the state of the component or the output of the component at the particular point in time.

In one example, the processing system implements a user interface visualization tool and a component module. The component module is configured to implement functionality of the component as it would run on an actual vehicle operating in the autonomous driving mode. The user input indicates the request to visualize the snapshot is received from a user of the processing system via the user interface visualization tool. The user interface visualization tool may be configured to display a section having interactive elements to select a snapshot, launch execution of the component module, stop execution of the component module, add a mutation to the snapshot, or toggle between two or more snapshots (including any combination thereof). The processing system may further implement a simulation daemon, in which the simulation daemon is configured to function as a separate process that serves as an abstraction layer between the user interface visualization tool and the component module.

In another example, upon evaluation of the snapshot and generation of the visualization, the processing system is further configured to cache information about the snapshot in order to either reduce an amount of time to evaluate modified versions of the snapshot or to reduce an amount of time to generate visualizations of the modified versions of the snapshot.

BRIEF DESCRIPTION OF THE DRAWINGS

FIG. 5 illustrates an example of snapshot validation in accordance with aspects of the technology.

FIG. 7 illustrates a first exemplary method in accordance with aspects of the technology.

FIG. 8 illustrates a second exemplary method in accordance with aspects of the technology.

FIG. 13 is method in accordance with aspects of the technology.

DETAILED DESCRIPTION

Aspects of the technology involve evaluating components of an autonomous vehicle that can be meaningfully evaluated over a single iteration, such as a single iteration of autonomous path planning or another aspect related to vehicle operation in an autonomous driving mode. One or more snapshots of single iteration scenarios can be tested quickly and efficiently. Each snapshot corresponds to a point in time where a particular component runs. Components can include, for instance, modules such as a driving planner that determines what driving operations the vehicle will take over the next few seconds, individual pieces within a module (e.g., submodules), or a group of modules, such as the planner plus a perception module (e.g., that evaluates sensor data obtained from an onboard sensor system in accordance with the field of view and other constraints of each sensor) plus a behavior prediction module (e.g., that estimates one or more possible actions to be taken by another nearby object, such as another road user).

A snapshot contains a serialized set of inputs necessary to run the given component. These inputs comprise the minimal amount of information needed to accurately and faithfully recreate what the component did or does. This information is stored in memory in such a way that it is maintainable (forward and backward compatible). After running the snapshot, the output of the component can be evaluated in a way that is customized to that component. In addition, collections of snapshots could correspond to a single scenario (e.g., varying over a small or large number of vehicle poses at a variety of different times in the scenario) or more general situations (e.g., the traveling in reverse while in a cul-de-sac). This approach enables rapid component evaluation on the order of 1-2 seconds or less, with extremely low latency to compile and run a snapshot, as opposed to minutes, hours or longer with complex simulations. One significant benefit to this low latency is near-instant evaluation of the software initialized from a snapshot. Separation between software and snapshot inputs allows software to rerun iterations of a single snapshot extremely rapidly so as to appear to the user to be near-instantaneous even as the snapshot input is modified.

Visualization of a snapshot can be performed in real time, readily enabling a user to see how a component is functioning. A user interface allows the user to introduce object mutations to one or more parameters of the component, and the modified snapshot can be immediately re-run. This allows the system to display the output of a given iteration of a component and update that output when there are changes to the underlying code base or the saved snapshot. As a result, a developer may more deeply understand how the system operates by "poking and prodding" in near-real time.

Example Vehicle Systems

Figure 1A:
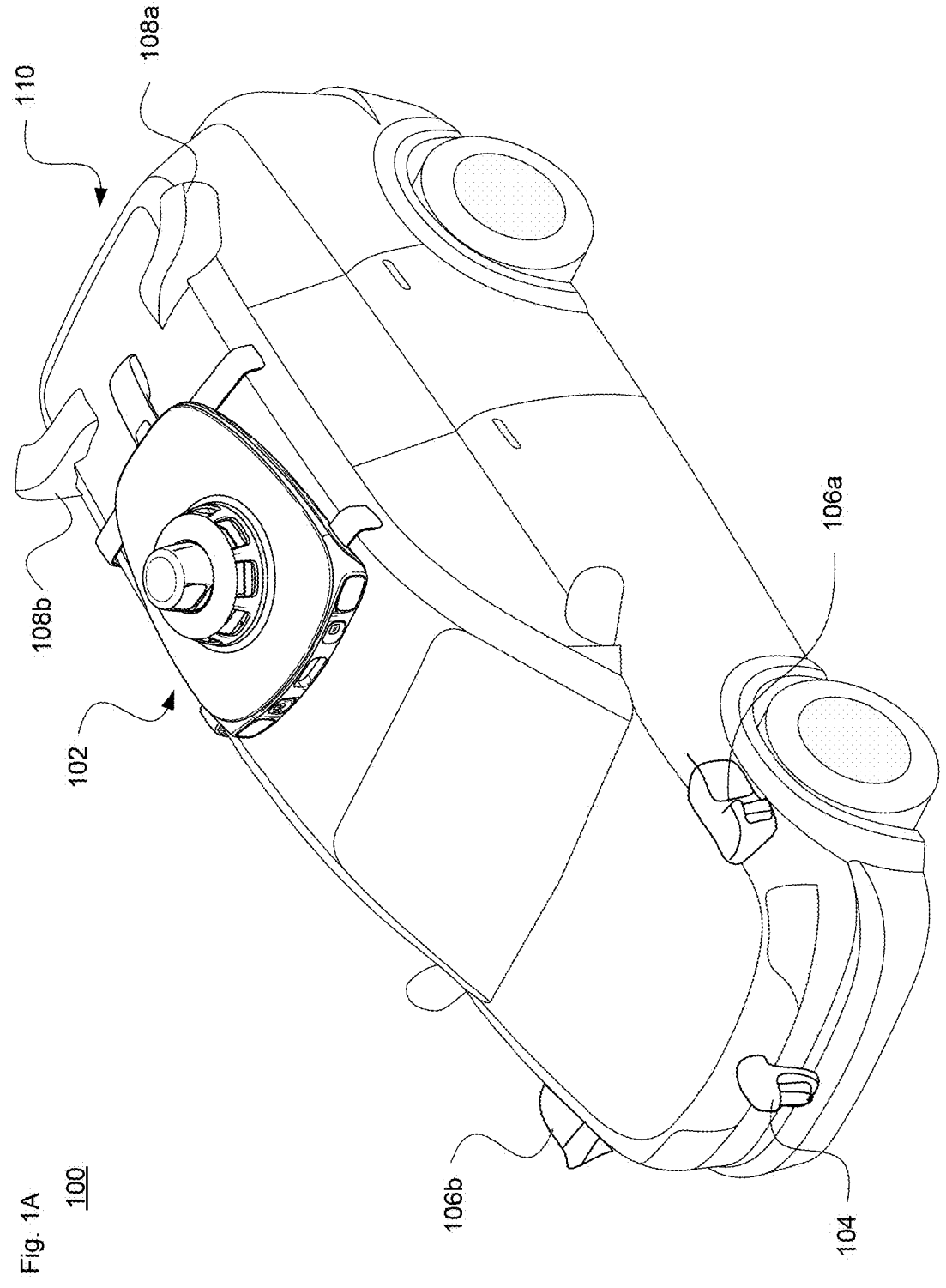
FIGS. 1A-B illustrate example passenger-type vehicles configured for use with aspects of the technology.
Figure 1B:
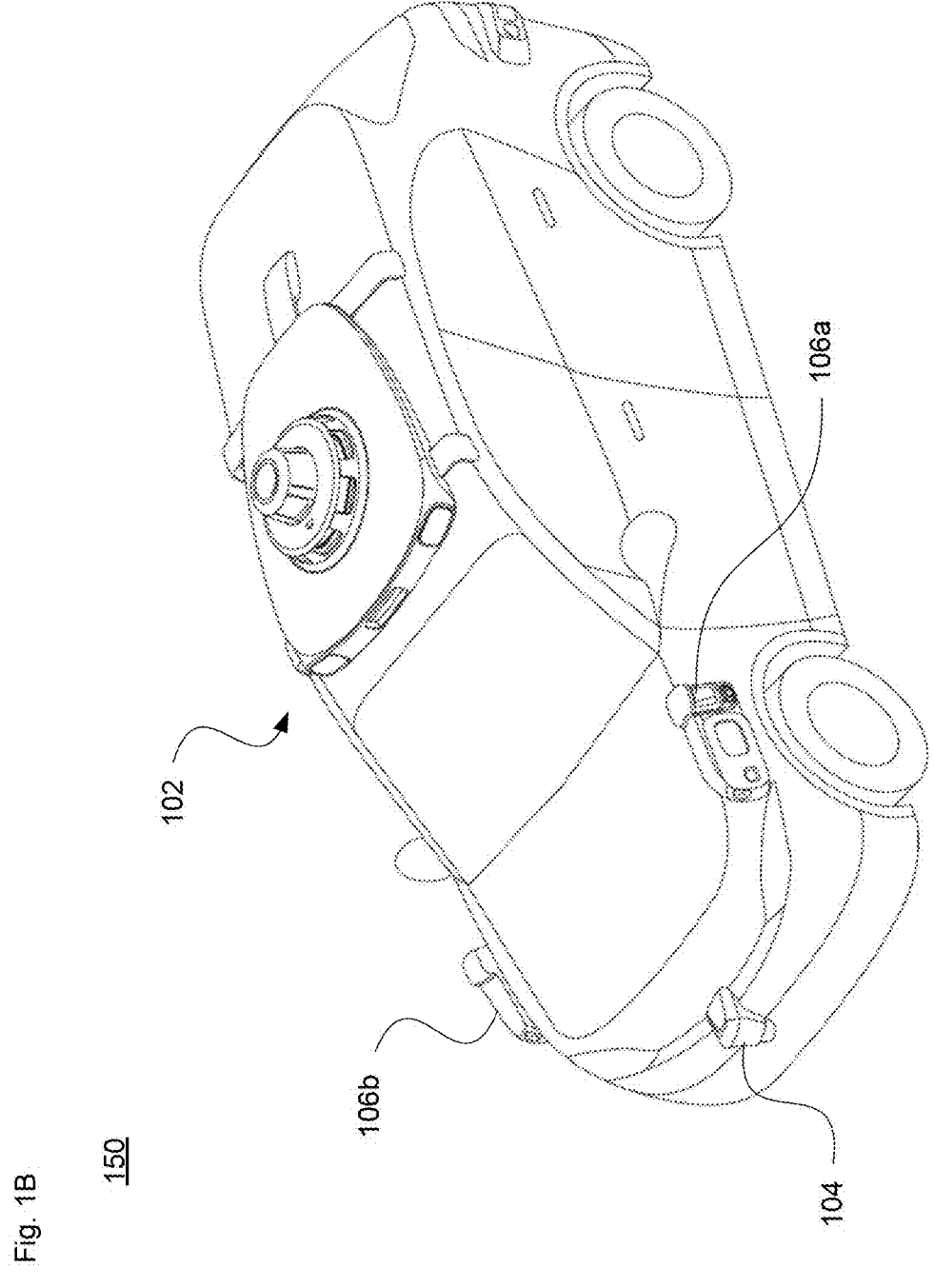

FIG. 1A illustrates a perspective view of an example passenger vehicle 100, such as a minivan or sport utility vehicle (SUV). FIG. 1B illustrates a perspective view of another example passenger vehicle 150, such as a sedan. The passenger vehicles, which may implement one or more aspects of the technology, include various sensors for obtaining information about the vehicle's external environment. For instance, a roof-top housing unit (roof pod assembly)

102 may include a lidar sensor as well as various cameras (e.g., optical or infrared), radar units, acoustical sensors (e.g., microphone or sonar-type sensors), inertial (e.g., accelerometer, gyroscope, etc.) or other sensors (e.g., positioning sensors such as GPS sensors). Housing 104, located at the front end of vehicle 100, and housings 106a, 106b on the driver's and passenger's sides of the vehicle may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

By way of example, each sensor unit may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be different types of vehicles that can transport passengers in an autonomous driving mode, including, but not limited to, cars, buses, motorcycles, trolleys, recreational vehicles, emergency vehicles, construction equipment, etc., as well as package transport and delivery using cargo trucks, delivery vans, and the like.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive fully autonomously without human assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
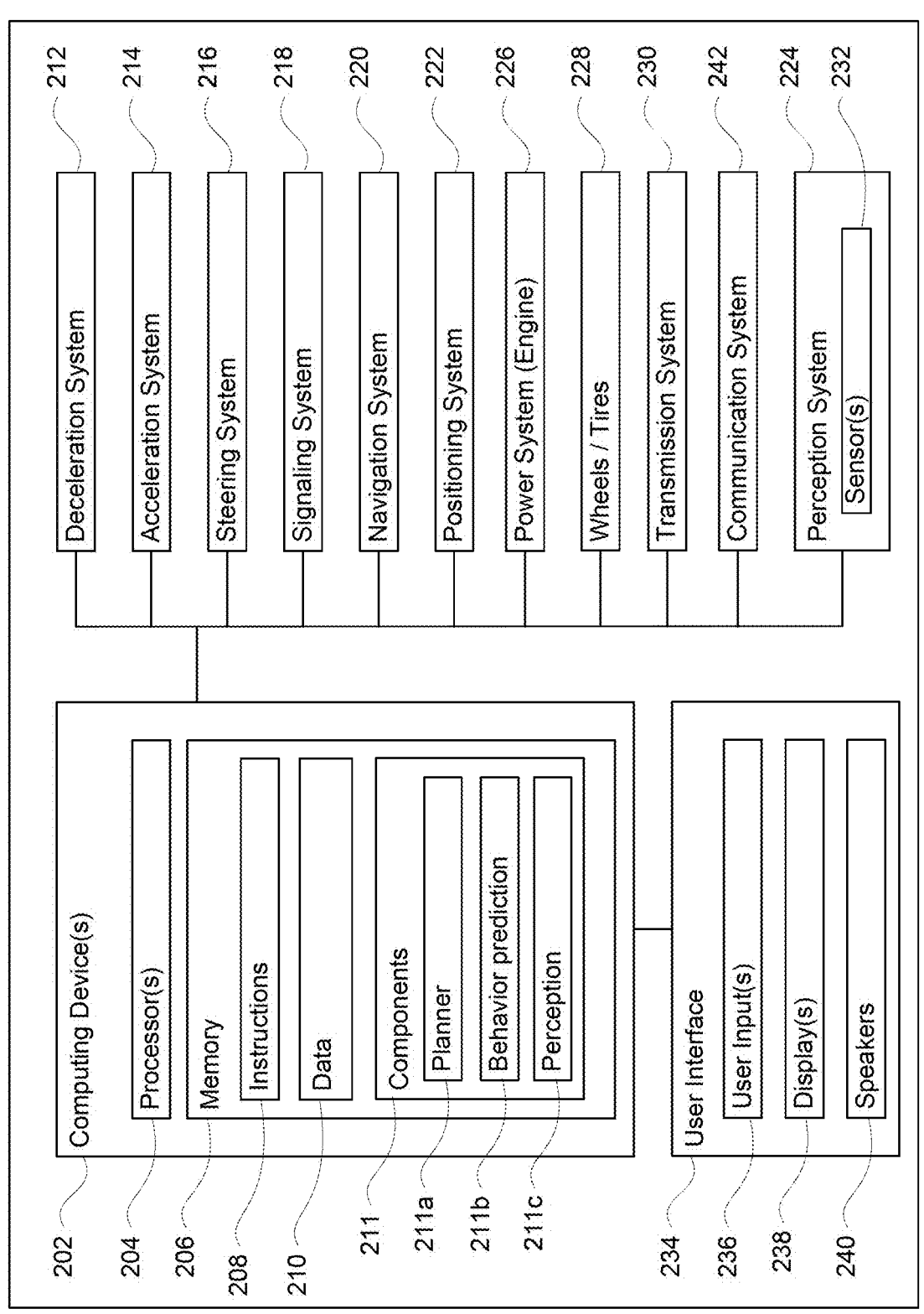
FIG. 2 is a block diagram of systems of an example vehicle in accordance with aspects of the technology.

FIG. 2 illustrates a block diagram 200 of a vehicle computing system with various components and systems of an exemplary vehicle, such as passenger vehicles 100 or 150, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor (s) 204. The computing system may control overall operation of the vehicle when operating in an autonomous driving mode.

Components 211 can include any piece of software that is run by computing devices 202 of the vehicle's computing system. By way of example, a component could refer to a module (e.g., planner module 211a), a group of modules (e.g., the planner module 211a, a behavior prediction module 211b, and/or a perception module 211c), or individual pieces within a module. As discussed further herein, a snapshot contains all of the inputs necessary to run the component. After running the snapshot, the output of the component can be evaluated in a way that is customized to that component. Collections of snapshots may correspond to a single scenario or more general autonomous driving situations.

The memory 206 stores information accessible by the processors 204, including instructions 208, data 210 and components 211 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or obtained sensor data, which may be on board the vehicle or remote, depending on the implementation.

The processors 204 may be any conventional processors, such as commercially available central processing units (CPUs) or tensor processing units (TPUs). Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system is configured to communicate with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose). The autonomous driving computing system may employ a planner module 211a, in accordance with the navigation system 220, the positioning system 222 and/or other components of the system, e.g., for determining a route from a starting point to a destination or for making modifications to various driving aspects in view of current or expected traction conditions. By way of example, the planner module 211a may determine a route upon receipt of a request to pick up a rider or a delivery. The request may be received by the vehicle from a backend system, such as a fleet management system.

The computing devices 202 are also operatively coupled to a perception system 224 (for detecting objects in the vehicle's environment), a power system 226 (for example, a fuel cell and/or internal combustion engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle according to short term trajectories, e.g., via the planner module 211a, by controlling various components. By way of example, computing devices 202 may navigate the vehicle to a destination location completely autonomously using data from the map (e.g., roadgraph) information and navigation system 220. Computing devices 202 may use the positioning system 222 to determine the vehicle's location, and the perception system 224, perception module 211c and behavior prediction module 211b to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine or fuel cell of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed roadgraphs or other maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The sensors 232 are located in one or more sensor units around the vehicle. The detected objects may be other vehicles, obstacles in the roadway, traffic signals, signs, trees, bicyclists, pedestrians, etc. The sensors 232 may also detect certain aspects of weather or other environmental conditions, such as snow, rain or water spray, or puddles, ice or other materials on the roadway. The perception module 211c evaluates sensor data obtained from the sensors 232, for instance to determine whether point cloud data from a lidar sensor has detected another road user (e.g., a truck or car). Occlusions and other sensor-related issues may be due to the sensor's field of view, low light conditions, dirt or other covering on the sensor, etc., and these issues may be factored into the evaluation by the perception module 211c.

By way of example only, the perception system 224 may include one or more light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, acoustical sensors (e.g., microphones or sonar transducers), and/or any other detection devices that record data which may be processed by computing devices 202. Such sensors of the perception system 224 may detect objects outside of the vehicle and their characteristics such as location, orientation, size, shape, type (for instance, vehicle, pedestrian, bicyclist, etc.), heading, speed of movement relative to the vehicle, etc.

The perception system 224 may also include other sensors within the vehicle to detect objects and conditions about or within the vehicle, such as in the passenger compartment. For instance, such sensors may detect, e.g., whether a door is open or closed, the presence of one or more persons, pets, packages, etc. within the vehicle., as well as conditions within and/or outside the vehicle such as temperature, humidity, etc. This can include detecting where the passenger(s) is sitting within the vehicle (e.g., front passenger seat versus second or third row seat, left side of the vehicle versus the right side, etc.). The interior sensors may detect the proximity, position and/or line of sight of the passengers in relation to one or more display devices of the passenger compartment. Still further sensors 232 of the perception system 224 may measure the rate of rotation of the wheels 228, an amount or a type of braking by the deceleration system 212, and other factors associated with the equipment of the vehicle itself.

The raw data obtained by the sensors can be processed by the perception system 224 and/or sent for further processing to the computing devices 202 periodically or continuously as the data is generated by the perception system 224. The perception module 211c may be part of the perception system 224, the computing devices 202, or both. Computing devices 202 may use the positioning system 222 to determine the vehicle's location and perception system 224 to detect and respond to objects when needed to reach the location safely, e.g., via adjustments made by planner module 211a and behavior predictions from the behavior prediction module 211b, including adjustments in operation to deal with occlusions, actions likely to be taken by another road user, and other issues. In addition, the computing devices 202 may perform calibration of individual sensors, all sensors in a particular sensor assembly, or between sensors in different sensor assemblies or other physical housings.

Computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. By way of example, displays may be located, e.g., along the dashboard, on the rear of the front row of seats, on a center console between the front row seats, along the doors of the vehicle, extending from an armrest, etc. Other output devices, such as speaker(s) 240 may also be located within the passenger vehicle.

The passenger vehicle also includes a communication system 242. For instance, the communication system 242 may also include one or more wireless configurations to facilitate communication with other computing devices, such as passenger computing devices within the vehicle, computing devices external to the vehicle such as in another nearby vehicle on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Example Implementations

In view of the structures and configurations described above and illustrated in the figures, various aspects will now be described in accordance with aspects of the technology.

As noted above, one or more snapshots of single iteration scenarios can be tested quickly and efficiently. This can be particularly beneficial for components whose output affects the input on the next iteration. For instance, output from the planner 211a affects the vehicle's pose, which in turn affects the next iteration of the planner. By testing individual iterations, minor differences in the output will not compound over time. This enhances reproducibility and can help isolate performance in edge cases where small discrepancies may have a large impact on system operation (e.g., when a pedestrian is identified as being on the sidewalk 2 meters from the vehicle versus along the curb 1 meter from the vehicle).

A snapshot contains sufficient detail of the inputs necessary to run a component (e.g., a module, group of modules, or an individual feature within a module), e.g., enough information so that the inputs can be regenerated. After running the snapshot, the output of the component can be evaluated in a way that is customized to that component. In one example, this can be done to find out if a given run of a component was able to find a solution deterministically (outputs are consistent when inputs are the same). In another example, the evaluation can see if a given change affected the components output, such as to test the neutrality of some architectural changes. Unlike certain testing situations, the component does not need to "pass" the snapshot evaluation. Here, passing includes having express pass/fail criteria, and passing would mean that all criteria are satisfied; otherwise, it would be considered to "fail". However, there may be many parts of the autonomous driving system that do not have clear pass/fail criteria at a discrete point in time. Snapshots can be used very effectively in such situations. For example, by considering a large number of snapshots, metrics can be defined for a given component (e.g., predicted distance to other objects over the next second). Snapshot use cases may include performance testing, non-determinism, heuristic evaluation, general behavior testing, and understanding how changes in perception affect planner behavior.

Snapshot Initiation

Figure 3:
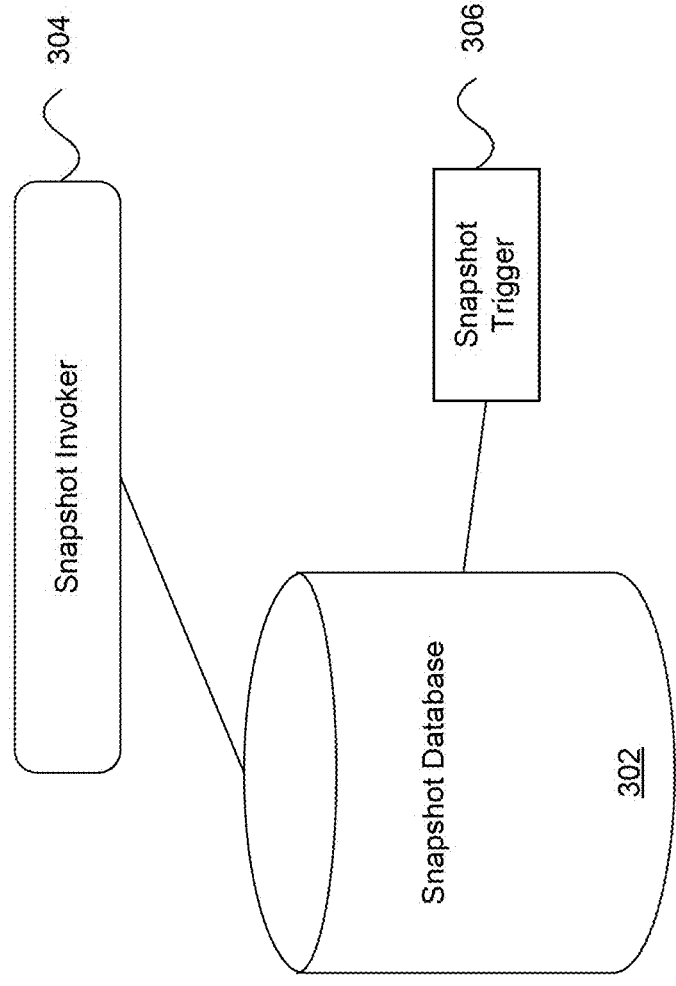
FIG. 3 illustrates an example architecture in accordance with aspects of the technology.

Each snapshot is a serialized input to a component or subcomponent that contains all the information needed to run a single iteration of that component or subcomponent. As shown in FIG. 3, the ecosystem 300 for snapshots comprises the storage system for managing/accessing a database of snapshots (a snapshot database 302), the tools required to run a given component or subcomponent based on a particular snapshot and analyze the results of the [sub]component's output (a snapshot invoker 304), and a mechanism that triggers the snapshot (a snapshot trigger 306) to be dumped onboard (e.g., into memory 206) or offboard (e.g., into a database of a remote management system such as a back-end fleet management system).

Figure 4:
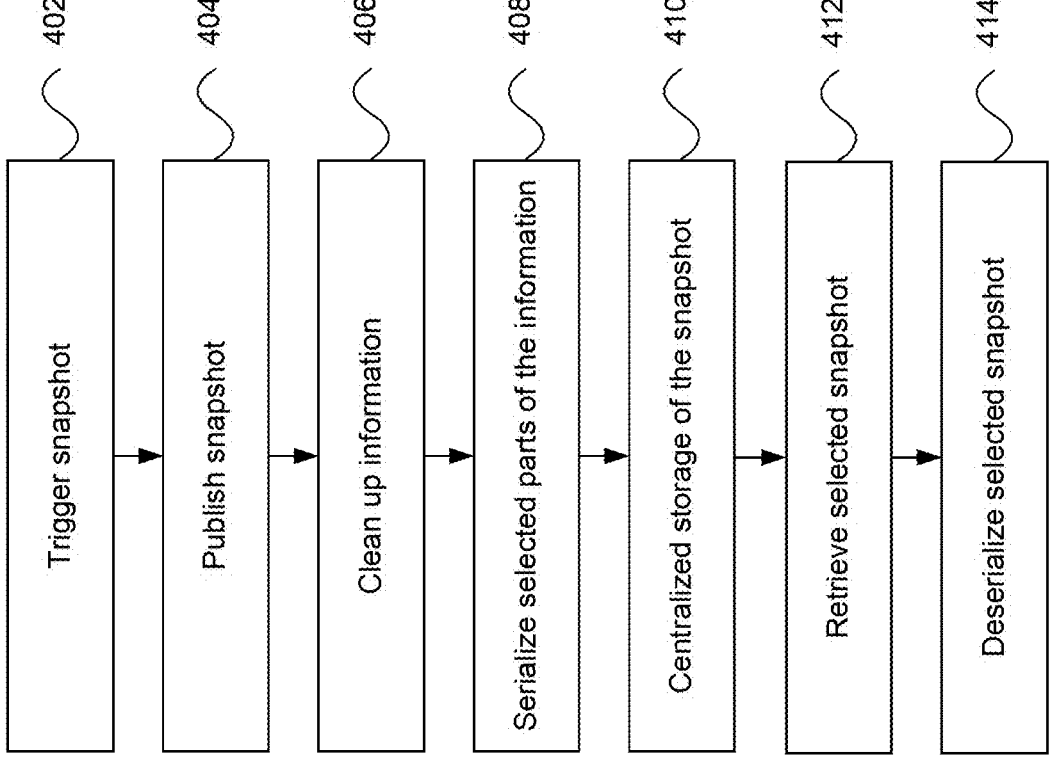
FIG. 4 illustrates an exemplary snapshot process in accordance with aspects of the technology.

FIG. 4 illustrates an example approach 400 for serializing and storing the snapshot data. At block 402, a snapshot is triggered, for instance according to a criterion being met for a driving scenario or a component of the vehicle. This may be done either during real-time driving by the vehicle in the autonomous driving mode, or during a simulation (e.g., performed by a back-end processing system). At block 404, the snapshot is published. Per block 406, the information may be cleaned up, e.g., to remove intermediate variables. Then at block 408, some or all of the snapshot information is serialized. The snapshot is then stored in memory, such as a central storage location, at block 410. The snapshot may be retrieved for evaluation at block 412. Here, the snapshot is deserialized at block 414 prior to execution for the evaluation. These actions are discussed in detail below.

By way of example, a configuration passed into the system by the snapshot trigger 306 tells the snapshot writer in which situations it should write to the database 302 (e.g., for centralized storage at block 410). Then offline, when one wants to run the component from snapshot (e.g., upon retrieval at block 412), one can use a snapshot invoker 304, which is passed in a snapshot from the database and knows how to (1) initialize the internal structures so that they are equivalent to how it was originally, and then (2) invoke the component by passing in internal structures in their newly initialized form.

According to one aspect of the technology, the system may determine that the state of a component should be captured as a snapshot in various ways. For instance, the determination (trigger at block 402) may come from a flag, a timer, or an explicit message request. The messaging system allows a module (e.g., the planner module) to subscribe and publish messages of predefined types via the vehicle's internal communication bus (e.g., a Controller Area Network (CAN) bus or a FlexRay bus). Thus, a particular message would be listed as one of those predefined message types, and the module would subscribe to messages of that type. In one scenario, an example of a flag would be to capture a snapshot every single planner iteration. With regard to an explicit message request, a component would subscribe to, e.g., a "Snapshot Request" message, that, upon receipt, would trigger the component to invoke the snapshot writer to publish out the snapshot (e.g., at block 404, such as to the database or a temporary location at block 410 that then gets stored longer term in the database).

One situation for triggering a snapshot during real-time autonomous driving may be to automatically export a snapshot at a given interval (e.g., every 2-5s). Thus, if an interesting event occurs for a component, there would be a recent snapshot from which to play back from. This approach is particularly useful for recreating an abnormal exit (e.g., a process crash or process failure), because once the vehicle has entered a bad situation, the system may no longer be able to produce a useful snapshot. There may be a storage requirement or limit for the interval snapshots. However, the system may keep only snapshots that are marked as "interesting", may only perform interval capture during certain situations, etc. For instance, an interesting example may be something that is rare in the data or something that is atypical for the software. A rare data situation may be a peloton of cyclists along a residential street or a vehicle backing up along a highway/freeway. An atypical software condition may be that for some reason a part of the planner module reports an error. Here, for example, if one of the trajectories the planner produces requires that the steering wheel of the car be turned much faster than is permissible (e.g., in view of a passenger discomfort profile), then the planner would enter a safe fallback mode and use a different trajectory instead of that one.

Another situation for triggering a snapshot would be for the vehicle's onboard system to request a snapshot based on an interesting event. For instance, individual components may flag when an interesting or problematic event has occurred. Here, the planner module may create a snapshot whenever the system predicts a collision. Or a component may create a snapshot whenever the component runs for too long. In another example, an overlap generation sub-module could save another objects trajectory's geometry and the relevant behavior prediction when it encounters an unrecoverable error. In a further example, when the behavior planner detects an agent (a detected perception object) that is anomalous by not following its behavior predictions, then the behavior planner could save information about the relevant perception object. Or in another example, a component could save its inputs whenever it encounters an error that causes it to fail to produce a plan.

Yet another triggering situation would be with an offboard (remote) request a snapshot during simulation. Here, the system could add snapshots to its triage processes (e.g., bugs, disengages, scenario failures, etc.) Snapshots would provide an alternative way of testing an issue. In many cases, human triggers could be enlisted to manually create snapshots and add them to a relevant group of pre-existing snapshots. Alternatively or additionally, snapshots could be obtained from existing scenarios or any other simulation environment. For example, a scenario may be run by a backend system, periodically creating snapshots for the relevant component. Snapshots could also be created from different variations of the same scenario. Once it is saved, the situation that the snapshot is testing would not change over time. This could be particularly helpful for identifying or addressing critical bugs.

Upon determining that a snapshot should be captured, the system will dump the state as a snapshot and publish it over the onboard application programming interface (API) per block 404. Once the snapshot has been published, it can be stored in a database where it can be accessed for testing one or more desired use cases. For instance, the internal state stored in a data structure is serialized out into a protocol buffer (at block 408) that is then either saved to a file (if there is a filesystem accessible) or published over the communication bus. While protocol buffers can be employed, any serialization format would be suitable.

A snapshot may be taken at the initiation of a component, the completion of an iteration of the component (or subcomponent), or some time in between. This is helpful for being able to isolate a specific part of the system and reproduce a behavior even if an upstream component has changed its outputs and therefore the downstream component's inputs. A given component may be associated with one or more messages or other data from different parts of the autonomous vehicle control system. In addition, various kinds of data (e.g., input data, derived data and/or state data such as cross-iteration state data) may be utilized or generated by the given component during an iteration. Depending when the snapshot is taken, there may be different input data as input to the component or different amounts of derived data generated by the component. The system could take snapshots at a few different points in the pipeline to be able to run sub-parts of the pipeline from those moments. The decision on which data to serialize may depend on when the snapshot is taken and the data at that point in time. For instance, if a component consumes a lot of data as input that is also stored elsewhere, the snapshot does not need to also store that same input and instead can simply contain a pointer to the other location that the snapshot writer and snapshot invoker both understand how to access.

Snapshot Storage and Serialization

Upon publication, all of the state information associated with the snapshot is centralized, being stored in a common location in the snapshot database. According to one aspect of the technology, the system saves the minimal amount of information needed to accurately and faithfully recreate what the component did at a particular point in time. The information is stored in a format that is maintainable and is ideally both forward and backward compatible. Selected parts of the state information are serialized for efficient storage and is deserialized upon retrieval.

Serializing and storing the snapshot data can be performed with robust evaluation and analysis. For instance, a large data set is taken and a comparison is made running from a snapshot to the original run. For each instance where the snapshot version produces different outputs, the system compares the intermediate outputs of the two until the moment of divergence can be pinpointed where there is most often some state that is missing from the snapshot, or there is a discrepancy in how the snapshot invoker initializes an internal data structure and how it is initialized in the original run. The system may continuously find and fix these issues until a threshold level of correctness is reached. For information cleanup, any intermediate variables where serialization is stored (outside the original internal state structure) can be deleted. This can be done asynchronously. According to one scenario, the system may serialize the minimum amount necessary to exactly (byte-for-byte) reproduce the output of the module. The data may be maintained in a protocol buffer wire format, which can be compressed as needed. [

FIG. 5 illustrates an example flow 500 for ensuring that snapshot serialization is correct. In this example flow, a snapshot with a given run (e.g., set of initial conditions) is obtained at block 502 and played back for a component (e.g., the planner module). During playback, the data is serialized at block 504 into an iteration snapshot and deserialized back into internal data structures at block 506. The deserialized information from block 506 and the pre-serialized information from block 502 are fed to a validation block 508, and debugged at block 510 as needed. For instance, if the validation shows that the deserialized information conforms to the pre-serialized information, then the serialization is confirmed to be accurate and the process ends. Otherwise, the debug operation at block 510 will flag any discrepancies.

Depending on the use case, there are different things that may need to be serialized. For example, a trajectory ranking cost function might not require everything that is in a snapshot in order to produce a correct cost. When storing those types of snapshots, irrelevant data can either be cleared or never serialized in the first place. For instance, the system may provide data filtering based on intended usage of a given snapshot.

Subcomponents, or modularized components of another component, may handle two categories of inputs: constant inputs and intermediate inputs. Constant inputs are inputs that are constant for the duration of the component iteration, and are therefore equivalent if captured at the beginning or at the end of the iteration. In contrast, intermediate inputs are inputs that cannot be ascertained in the beginning of the iteration because they either do not exist because they are temporary (e.g., an intermediate state), or their values have been mutated before reaching this subcomponent (e.g., a lane change state). While constant inputs should always be available in a given snapshot, intermediate inputs need to somehow be captured. To this effect, for each component there may exist the notion of individual component snapshots that include precisely that intermediate state. This can be represented in an exemplary code module as:

```
message ComponentInput {
    oneof {
        ComponentAInputs componentA=1;
        ComponentBInputs componentB=2;
        etc . . .
    }
    optional string id=3;
}
repeated ComponentInput component_inputs=4;
```

With this combined representation, the system can easily add the ability to snapshot during the course of a given component iteration by appending to a global cache of component inputs. For instance:

```
//Subcomponent snapshotting onboard
RunComponent(component_state,        component_
    external_inputs, etc.) {
    if (CreatingSnapshot( )) {
        IterationSnapshot::Component component=<Create
            component data>;
        AddSnapshotComponent(std::move(component));
    }
    //Run work . . .
}
```

In one scenario, there are two options for invoking a given subcomponent from a snapshot (e.g., via the snapshot invoker 304 of FIG. 3). One is running the component as one would have otherwise, but injecting/overriding core inputs that need to be frozen in time. The other is running only the subcomponent as a stand-alone operation. Each component can maintain a shared API for consuming its inputs. For example:

```
class MyComponentInputs { }
class MyComponentInputsOffboard {
    MyComponentInputsOffboard(IterationSnapshotsnap-
        shot);
}
class MyComponentInputsOnboard {
    MyComponentInputsOnboard(const      InternalState&
        state, const ComponentWorld& world, . . . );
}
ComponentOutput  RunComponent(const  MyCompo-
    nentInputs& inputs) {
    //Do stuff;
}
//In invocation of component
MyComponentInputs inputs;
if(HaveSnapshot( )){
    inputs=MyComponentInputsOffboard
        (GetSnapshot( ));
} else {
    inputs=MyComponentInputsOnboard(state,      world,
        etc . . . );
}
RunComponent (inputs);
```

When component invocation is performed, a new set of outputs (e.g., a set of trajectories from the planner module) is produced in addition to debug data and updated state information. When invoking a component, the system runs the code in the same manner it would have been invoked originally, so that the same functions are called. For most subcomponents, some variation of RunComponent( ) may be called on the snapshot alone, given that the snapshot contains the relevant subcomponent information. The sub-component run will be less noisy and more robust to changes at other parts of the system. However, for some subcompo-nents this might be difficult to do due to a large number of dependencies on internal state and any difficulties in prop-erly serializing that state.

There may be several types of state which could be challenging to rebuild due to the nature of the dependencies. For those instances, instead of rebuilding all inputs, the system may instead inject them. For example:

```
//Where subcomponent gets invoked
MyComponentInjectedInputs inputs;
if (HaveSnapshot ( ) {
    inputs=MyComponentInjectedInputs(GetSnapshot( );
} else {
    inputs=MyComponentInjectedInputs(state,      world,
        etc . . . );
}
RunComponent(inputs, internal_state, ComponentWorld,
    etc);
```

According to another aspect of the technology, in addition to the inputs above the system may also serialized outputs. Here, each component can create a wrapper that runs from the snapshot and returns a proto (protocol buffer) from the same application programming interface (API). This can enable automatic validation on an arbitrary set of snapshots, such as:

```
//Capture a given snapshot.
IterationSnapshot snapshot;
//Capture each component's output in proto.
map<string, proto2::Message>component_outputs;
```

```
for (auto component: registered_components){
    proto2::Message output=component.Run(snapshot);
    ASSERT_THAT(output,     EquivToProto(componen-
        t_outputs [component.name( )]));
}
```

Testing and Evaluating with Snapshots

Once a snapshot has been captured, it may be programmatically altered (fuzzed or otherwise mutated) to provide significantly more coverage of a given situation. Snapshots can make it more feasible to evaluate a scene over a large number of different inputs for the vehicle's components. In one example, the system could test the vehicle's willingness to perform a lane change with another object in the adjacent lane. A large collection of snapshots may be created from a baseline snapshot. Thus, in this example the different snapshots may vary the vehicle's initial position as well as its speed and the other object's type (e.g., car, truck, bicycle, pedestrian, debris). If it is desired to just test a component submodule, the system could generate the snapshots by running the full component (e.g., the planner module) once, and then just save the inputs necessary to run the submodule.

Fuzzing can be applied on a variety of items to produce more robust testing and discovery of potential issues. One example is the snapshot iteration number, indicating when the snapshot is taken. This is particularly useful when considering that many critical situations have a spectrum of good behavior starting from avoiding the bad situation in the first place, to doing the right thing once we're in a bad situation. For instance, suppose there is a situation where the test system simulates an oncoming cyclist and causes the vehicle to evasively lane change into the cyclist's path. Here, it would be helpful to test both not changing lanes if not needed, and how to react (e.g., brake) when the vehicle is in that path.

Another beneficial aspect to fuzzing involves behavior prediction. In this aspect, it is useful to fuzz or otherwise mutate behavior prediction likelihoods and trajectory paths to ensure that the vehicle is robust to changes in behavior prediction. A further aspect involves perception objects, which have many properties that would be useful to fuzz. Such properties include contour, pose, heading, speed, acceleration, and object type. Here, fuzzing can be difficult to achieve in a realistic fashion, because if the state of an object changes significantly from one iteration to the next (e.g., a change in contour size of more than 20-30%, a change in object type from a truck to a bicycle, or a change that would violate the laws of physics), it would be unreasonable to expect that the planner's decision-making would be satisfactory.

Yet another aspect involves roadgraphs, which provide highly detailed map information of the vehicle's external environment, including roadway features, geometry, signage, speed limits, etc. Here, fuzzing of a roadgraph, such as by changing a roadway segment from a 2-lane segment to a 1-lane segment may also require updating behavior predictions and objects in the environment so that the match the updated roadgraph. Vehicle pose is a further aspect that can benefit from fuzzing. The vehicle pose, including its orientation along a segment of the roadway, can have a large impact on trajectory planning, so fuzzing with respect to the situation around the vehicle (e.g., where the vehicle is within the planned trajectory, or where the vehicle is within some bounding box) can aid in the discovery of potential issues. Finally, the field of view of one or more sensors of the vehicle, e.g., a lidar, radar or camera sensor, can help when testing occlusion scenarios.

Many sub-modules within the planner module and the behavior prediction module have clear expectations on their behavior. The passing sub-module is one such example, because in a lot of situations there are clear expectations on whether the vehicle should pass an object on the left or on the right. There are also a number of other ways that the output of a component may be evaluated. One of these is via open loop simulation.

For instance, in open loop simulation, at the end of its run, the planner module produces a trajectory. One way of using snapshots to test the planner module would be to have the vehicle follow the trajectory it publishes (in a simulation) and not run the planner again. This would also update other agents and have them react to the vehicle's position if they are smart agents. Using this, the simulation system could look for collisions or near collisions over the next few seconds (e.g., 1-2 seconds, or more or less).

Internal metrics are another way to evaluate component output using snapshots. There are many things within components that may correlate with suboptimal driving decisions or hard situations. Collections of snapshots may use these to provide guidance on whether or not a change makes a situation better or worse. For example, this could include selected speed finder discomfort, TSD erroring out, etc.

Labeled data or manually provided expectations are yet another way to evaluate components with snapshots. For instance, the desired output for a given component can be predetermined. By way of example, for passing, what passing decision are expected for an object may be labeled. Here, for a geometry optimizer module, a sketch of the path the optimizer is to track can be provided. Running the snapshot(s) for the optimizer can allow for comparison against the predetermined path from the sketch.

To help make snapshots even more robust, updates may be performed so that a given snapshot is forward and/or backward compatible as changes are made to components. Here, each snapshot may have a version number associated with it. The version number may be incremented (either automatically or manually) at any point in which a backwards or forwards incompatible or inconsistent change occurs. For a backward incompatible change (older binaries with versions less than a given version are incompatible with future snapshots), the snapshot loader may try to downgrade the snapshot. For a backward inconsistent change (older binaries with versions less than a given version are inconsistent with future snapshots), the snapshot loader may try to downgrade the given snapshot. In both cases, the snapshot loader is a distinctly separate binary, which is separate from the binary that runs from snapshot, because otherwise if is old code that is running from a new snapshot, the old code would not know how to downgrade). For a forward incompatible change (newer binaries with versions greater than a given version are incompatible with older snapshots), the logic that loads a snapshot may request an upgrader module to upgrade the snapshot. For a forward inconsistent change (newer binaries with versions greater than a given version are inconsistent with older snapshots), the logic that loads the snapshot may request the upgrader module to upgrade the given snapshot. In both cases, the snapshot loader may be a separate binary. Furthermore, regression tests can be set up to catch if a change was made in a way that was version incompatible. This testing could be run regularly to find issues.

Figure 6A:
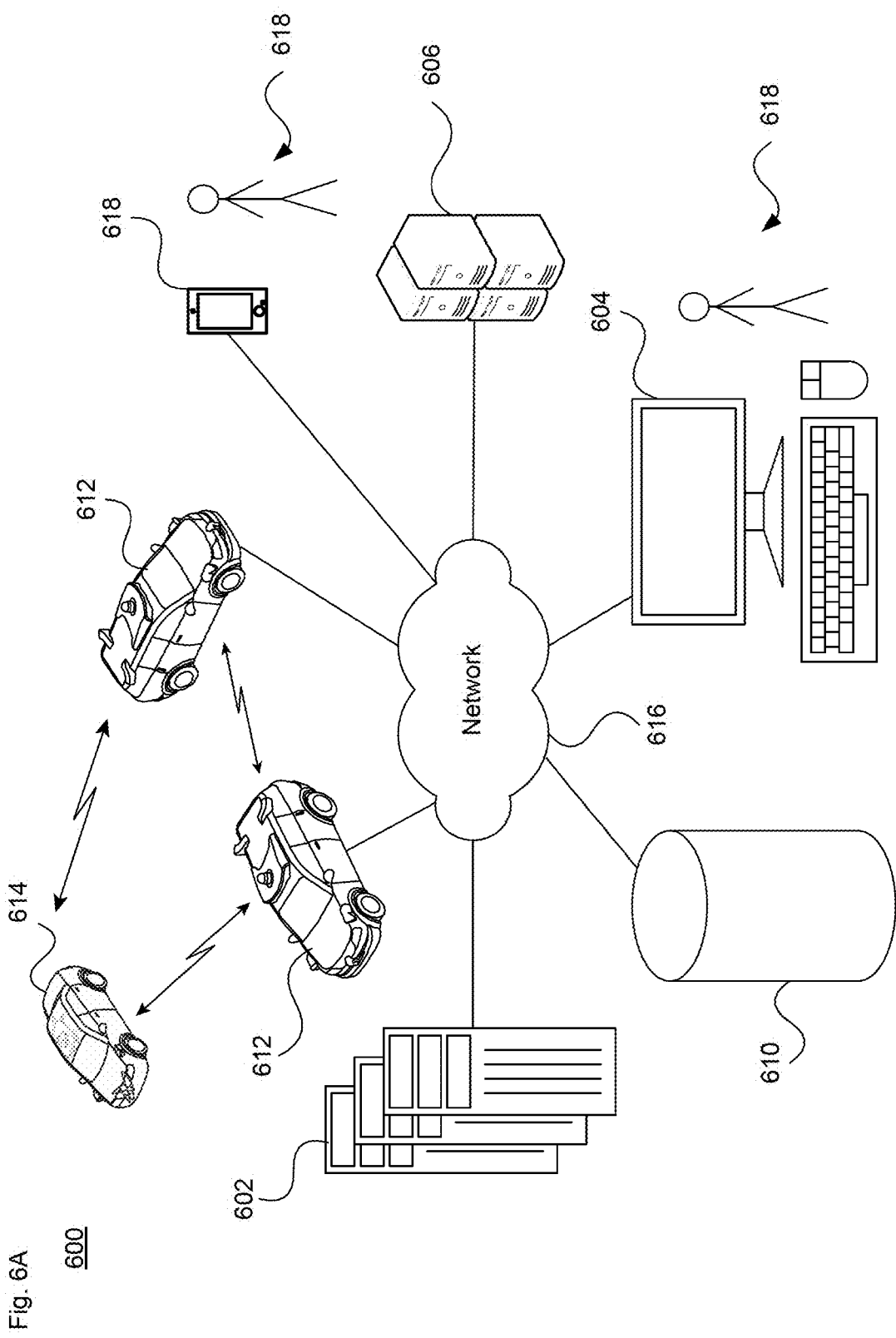
FIGS. 6A-B illustrate an example system in accordance with aspects of the technology.
Figure 6B:
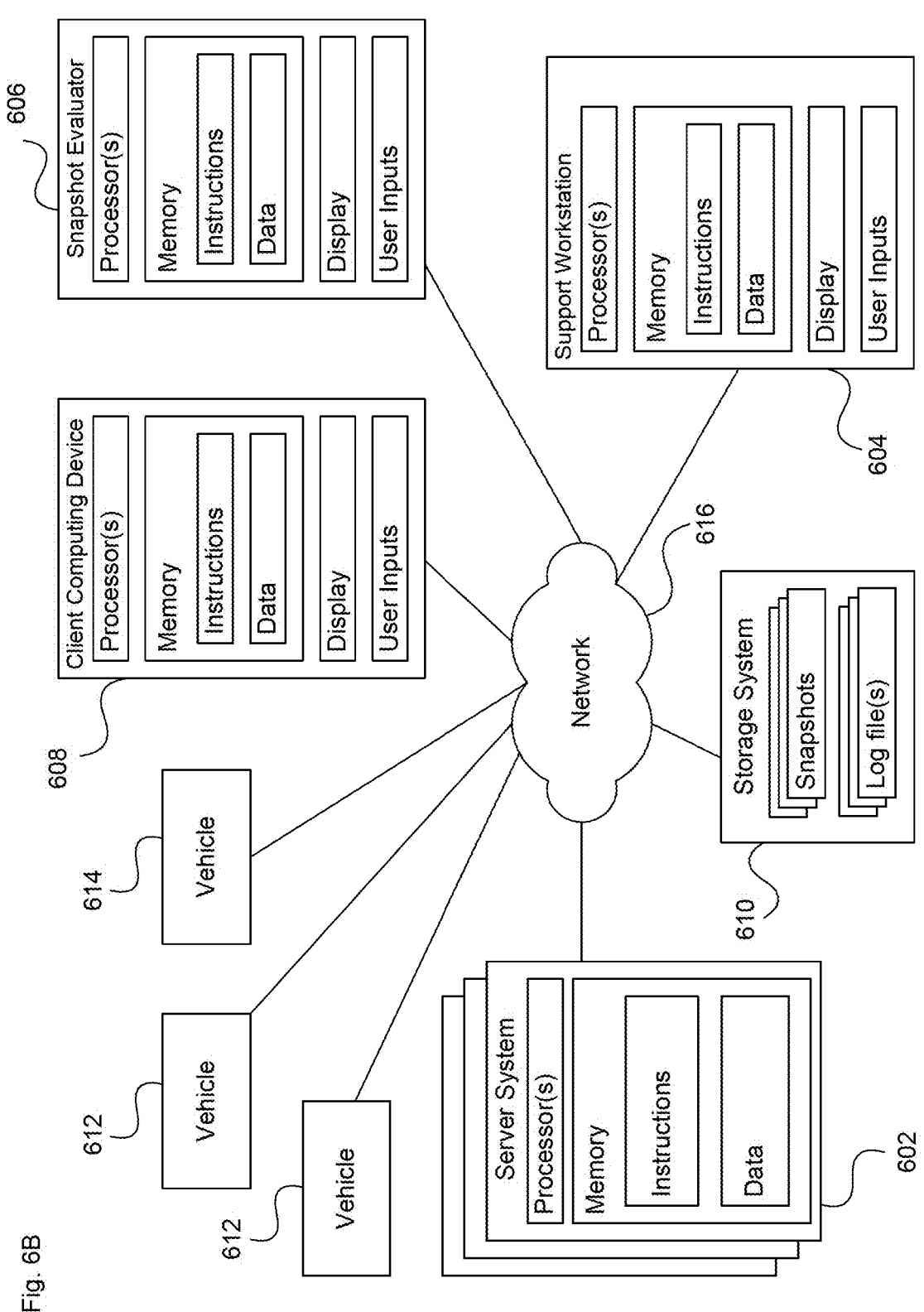

FIGS. 6A-B illustrate general examples of a system for taking, managing and using snapshots. This system may involve one or more autonomous vehicles, such as self-driving vehicles that are part of a fleet of vehicles capable of providing ridesharing services, grocery or package delivery, or the like.

In particular, FIGS. 6A and 6B are pictorial and functional diagrams, respectively, of an example system 600 that includes a plurality of computing devices 602, 604, 606, 608 and a storage system 610 connected via a network 616. System 600 also includes vehicles 612 and 614, which may be configured the same as or similarly to vehicles 100 and 150 of FIGS. 1A-B, respectively. Vehicles 612 and 614 may be part of a fleet of autonomous vehicles, which may or may not operate with a driver's assistance. Although only a few vehicles and computing devices are depicted for simplicity, a typical system may include significantly more.

As shown in FIG. 6B, each of computing devices 602, 604, 606 and 608 may include one or more processors, memory, data and instructions. Such processors, memories, data and instructions may be configured similarly to the ones described above with regard to FIG. 2. The various computing devices and vehicles may communication via one or more networks, such as network 616. The network 616, and intervening nodes, may include various configurations and protocols including short range communication protocols such as 802.11 protocols as well as ad-hoc protocols such as Bluetooth™ and Bluetooth LE™. Architectures such as the World Wide Web, intranets, virtual private networks, wide area networks, local networks, private networks using communication protocols proprietary to one or more companies, Ethernet, WiFi and HTTP, and various combinations of the foregoing can be employed. Such communication may be facilitated by any device capable of transmitting data to and from other computing devices, such as modems and wireless interfaces.

In one example, computing device 602 may function as a snapshot management system and include one or more server computing devices having a plurality of computing devices, e.g., a load balanced server farm, that exchange information with different nodes of a network for the purpose of receiving, processing and transmitting the data to and from other computing devices. For instance, computing device 602 may include one or more server computing devices that are capable of communicating with the computing devices of vehicles 612 and 614, as well as computing devices 604, 606 and 608 via the network 616. For example, vehicles 612 and 614 may be a part of a fleet of vehicles that can be dispatched by a ride or delivery provider system to various locations. In this regard, the computing device 602 may function as a dispatching server computing system which can be used to dispatch vehicles to different locations in order to pick up and drop off passengers or to pick up and deliver, food, packages or other cargo. In addition, server computing device 602 may use network 616 to transmit and present information to a user of one of the other computing devices or a passenger of a vehicle.

As shown in FIGS. 6A-B, each computing device 604, 606 and 608 may be a workstation, server system or personal computing device. By way of example, support workstation 604 and client computing device 608 may each be intended for use by a respective user 618, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The computing devices 604, 606 and/or 608 may also include a camera for recording video streams, speakers, a network interface device, and all of the components used for connecting these elements to one another. In this example, device 608 may be the device of a person who is currently in a vehicle 612 or 614, for instance in order to initiate snapshots under real-time driving situations in an autonomous driving mode.

Although the client computing devices may each comprise a full-sized personal computing device, they may alternatively comprise mobile computing devices capable of wirelessly exchanging data with a server over a network such as the Internet. By way of example only, client computing devices 608 may be mobile phones or devices such as a wireless-enabled PDA, a tablet PC, a wearable computing device (e.g., a smartwatch), or a netbook that is capable of obtaining information via the Internet or other networks, and which allows the person to initiate a snapshot process.

In some examples, computing device 604 may be a support workstation used by an administrator or operator to manage snapshot processes for one or more vehicles, or otherwise conduct off-line snapshot testing and evaluation. Although only a single support workstation 604 is shown in FIGS. 6A-B, any number of such workstations may be included in a given system. Moreover, although workstation 604 is depicted as a desktop-type computer, the workstation 604 may include various types of personal computing devices such as laptops, netbooks, tablet computers, etc. Computing device 606 may be, as indicated in FIG. 6B, a snapshot evaluator. By way of example, the snapshot evaluator may be a computing system that is able to test and validate snapshots, identify components, features or conditions that may be evaluated via snapshots, etc.

Storage system 610 can be of any type of computerized storage capable of storing information accessible by the server computing devices 602 and the other computing devices 604, 606 and 608, such as a hard-drive, memory card, ROM, RAM, DVD, CD-ROM, flash drive and/or tape drive. In addition, storage system 610 may include a distributed storage system where data is stored on a plurality of different storage devices which may be physically located at the same or different geographic locations. Storage system 610 may be connected to the computing devices via the network 616 as shown in FIGS. 6A-B, and/or may be directly connected to or incorporated into any of the computing. As shown, the storage system 610 may maintain a database of snapshots, which may include snapshots that have been serialized, deserialized or otherwise stored in accordance with the above discussion. Log files may also be maintained in the storage system 610.

FIG. 7 provides a method for evaluating a component of a vehicle configured to operate in an autonomous driving mode. The method includes, at block 702, triggering a snapshot at a particular point in time based on a criterion associated with either a driving scenario or a component of the vehicle while operating in the autonomous driving mode. The snapshot captures a set of inputs necessary to run the component in order to identify either a state of the component or an output of the component at the particular point in time. At block 704, the method includes serializing at least a portion of a set of state information corresponding to the snapshot at the particular point in time. The set of state information is a minimal amount of information needed to recreate an action or a state of the component at the particular point in time. At block 706, the method includes storing the snapshot in memory, including storing the set of state information with the serialized portion thereof. At block 708, the method includes performing a deserializing operation on the serialized portion of the stored set of state information. And at block 710 the method includes providing the snapshot with the deserialized portion of the set of state information for evaluation of the state of the component or the output of the component at the particular point in time.

FIG. 8 provides a method for evaluating a component of a vehicle configured to operate in an autonomous driving mode. At block 802 the method includes receiving a request to invoke a snapshot, in which the snapshot has captured a set of inputs necessary to run the component of the vehicle in order to identify either a state of the component or an output of the component at a particular point in time. At block 804, the method includes retrieving the snapshot from a database. The snapshot includes a set of state information that is a minimal amount of information needed to recreate an action or the state of the component at the particular point in time. At least a portion of the state information has been serialized. At block 806, the method includes performing a deserializing operation on the serialized portion of the set of state information. And at block 808, the method includes performing, upon the deserializing, an evaluation of the snapshot to identify either the state of the component or the output of the component at a particular point in time.

Snapshot Visualization

One powerful aspect for evaluating snapshots is the ability to select a snapshot and visualize how the component operates in real time. That is, once the user selects a snapshot for visualization and requests the system to run it, including with any mutations or other changes, the results are presented to the user in real time, such as within 1-2 seconds. This may be done using a snapshot evaluation system, such as computing device 606 (FIGS. 6A-B) discussed above. The snapshot evaluation system provides an interactive user interface that allows a user to select a snapshot, edit or otherwise modify one or more aspects of the snapshot, and then observe how the component operates based on the modification(s). As noted above, when one wants to run the component, a snapshot invoker can be used to obtain the snapshot from a database and initialize the internal structures of the snapshot. Upon invocation, the snapshot may be modified (e.g., fuzzed or otherwise mutated) to evaluate one or more situations or conditions.

Figure 9:
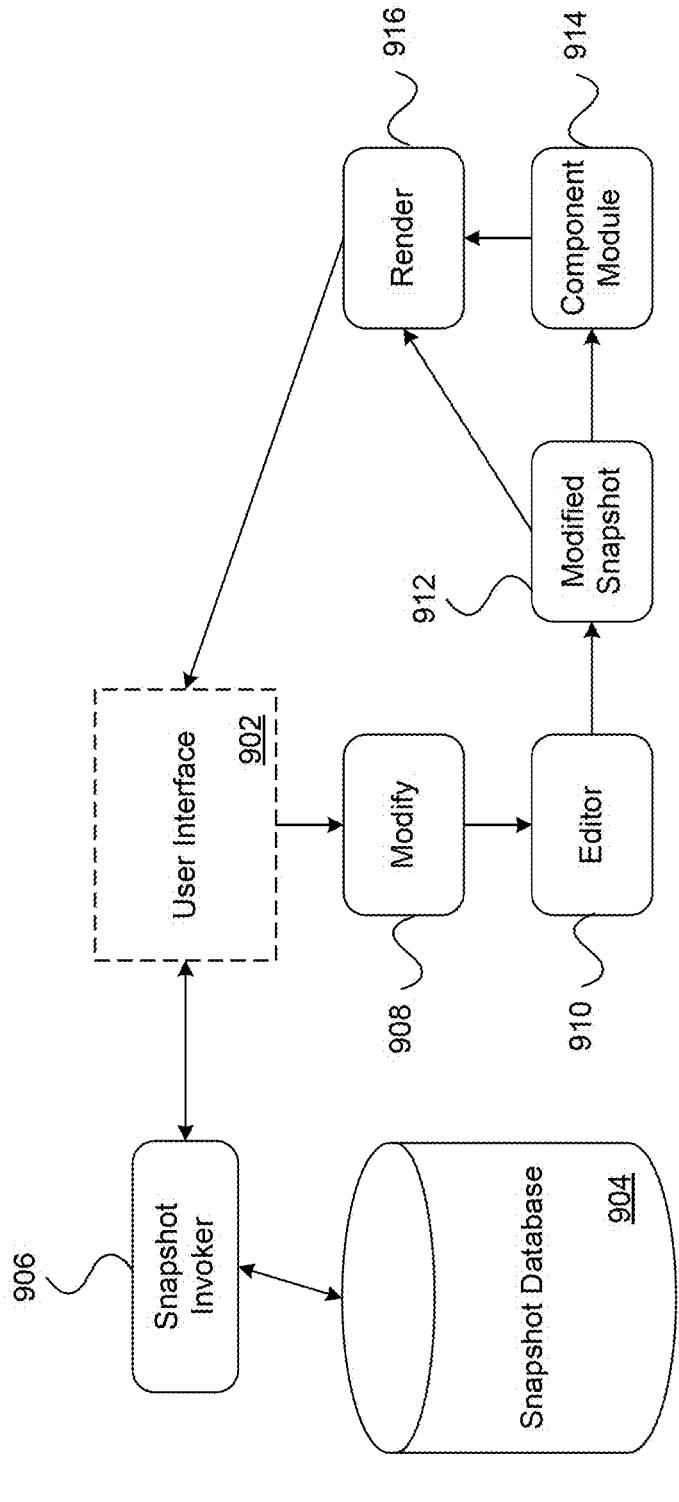
FIG. 9 illustrates an example user interface approach in accordance with aspects of the technology.

FIG. 9 illustrates one example 900 of how a user interface may be employed to modify a snapshot and generate a visualization based on the modification. As shown, a user interface (e.g., of snapshot evaluator 606 of FIG. 6B) may be used to evaluate a component by modifying a snapshot stored in snapshot database 904. Input from the user interface 902 or another action (e.g., a software modification associated with the component) may cause snapshot invoker 906 to retrieve a particular snapshot from the database 904. A person may, via one or more user inputs of the UI, select one or more features of the snapshot to modify as indicated in block 908. This can be done, e.g., via command line input, radio buttons, drop-down menus, slide bars, dials or other control tools, as well as via hand gestures or verbal instructions.

The modification block 908 takes the inputs from the UI and converts them into modification requests. In accordance with the input(s), the system makes changes to the snapshot either as stored in the database or a copy that has been retrieved from the database. For instance, an editor module 910 receive the modification requests from the modification block 908, causing changes to be made to the snapshot. This results in a modified snapshot at block 912. Information from the modified snapshot can be sent to both a component module 914 and a rendering module 916. Information from the component module 914 (such as trajectory information from a planner component) may also be provided to the rendering module 916. The rendering module 916 takes the information received from the modified snapshot 912 (e.g., a snapshot path) and component module 914 (e.g., planner trajectory) and renders them for display on a display device by the UI (e.g., the display(s) of the snapshot evaluator 606 of FIG. 6B).

Modifications can be applied to individual objects (e.g., other road users, occluding objects such as buildings, trees, signage, etc.), as well as to behavior predictions. For objects, modifications can include shifting it to a new position on a map or in a 3D scene, a change in heading, a change in speed, a change in type (e.g., pedestrian instead of bicyclist, or sedan instead of tractor-trailer truck), or a change in shape (e.g., made smaller or larger). Modification to a behavior prediction can include changes to the likelihoods for a set of predictions, an adjustment to a planned trajectory, etc. This can be complex because the state needs to be internally consistent. Thus, if an agent (object) location is modified, its history stored in the snapshot also needs to be updated. Updated or otherwise modified snapshots may be saved in the database. This may be particularly helpful for caching and sharing particular permutations when debugging different modules.

Figure 10A:
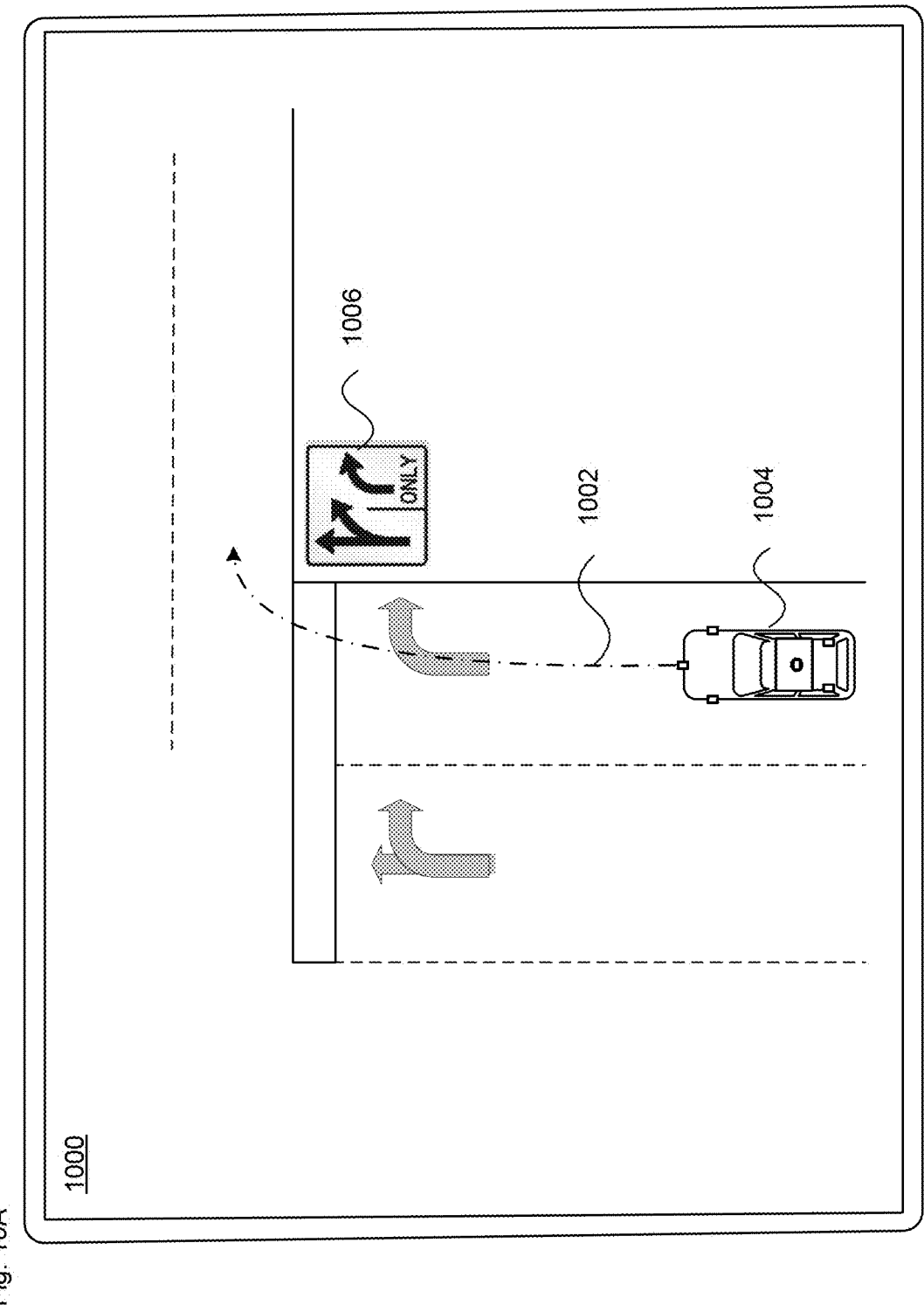
FIGS. 10A-D illustrate user interface-based snapshot modification and visualization in accordance with aspects of the technology.
Figure 10B:
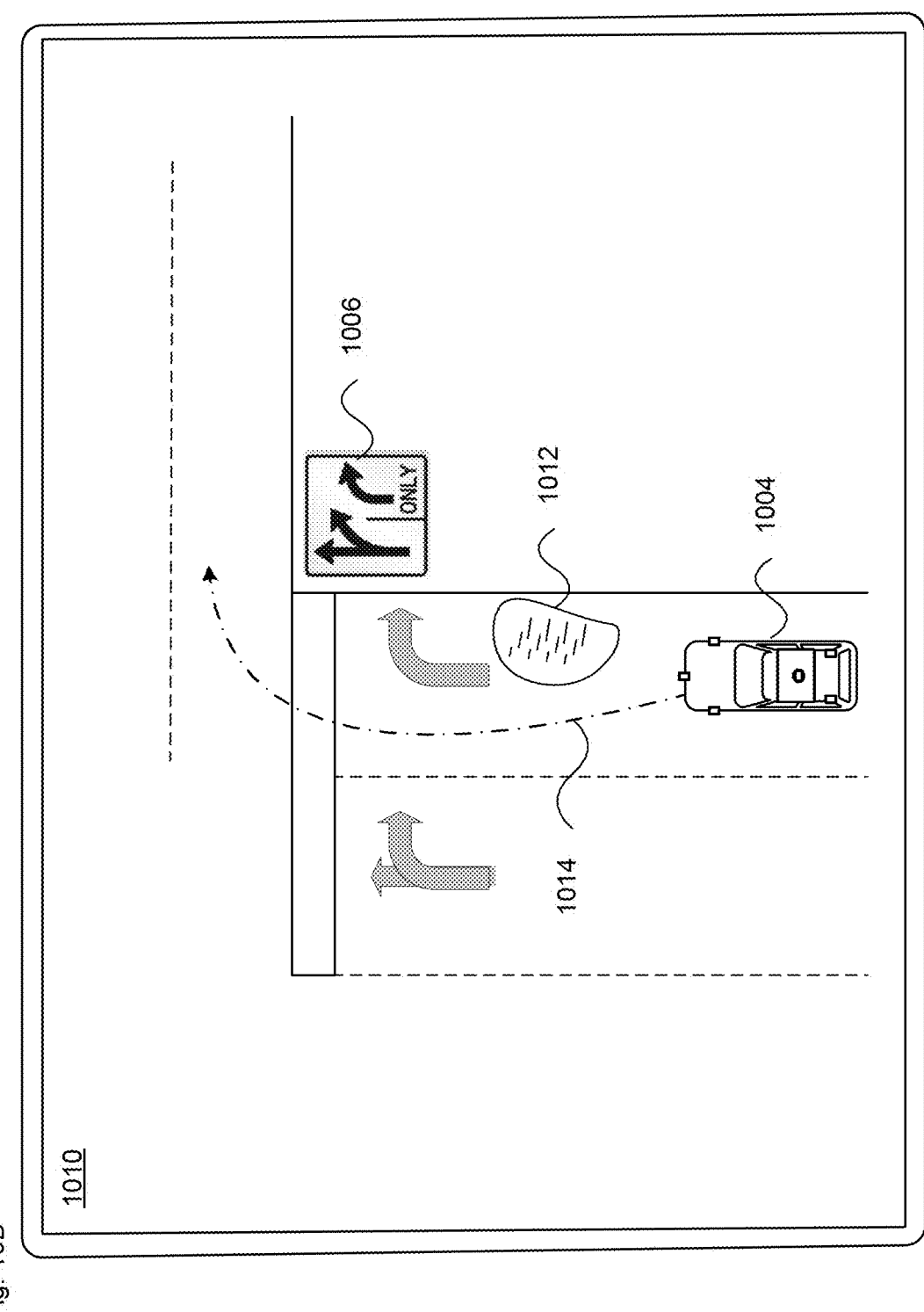

FIGS. 10A-B illustrate one modification situation. Here, as shown in view 1000 of FIG. 10A, the component may be a planner module that determines a trajectory 1002 of a vehicle 1004 from the right lane of a two-lane road segment. In this example, both lanes may permit right turns, with the left lane also permitting vehicles to go straight, as shown by the road markings and adjacent sign 1006. The UI would render the trajectory on the display to show the vehicle 1004 moving along the trajectory 1002. As shown in view 1010 of FIG. 10B, modification to the snapshot may include adding an object to the scene, such as a puddle 1012. The object may be static as with puddle 1012, or dynamic, such as another road user or a pedestrian that may have its own trajectory. In the example of FIG. 10B, when the modified snapshot is executed according to the component module and rendered for display, the person may see a visualization with a changed trajectory 1014 as the vehicle shifts in the lane to avoid the puddle 1012. The size, shape and/or depth of the puddle could be varied and/or other objects could be introduced, so that the person can evaluate how the vehicle would react to each modified situation. And because the person has control over the changes via the UI inputs, it can be readily apparent whether certain changes (e.g., doubling the size of the puddle) elicit specific responses by the vehicle.

Figure 10C:
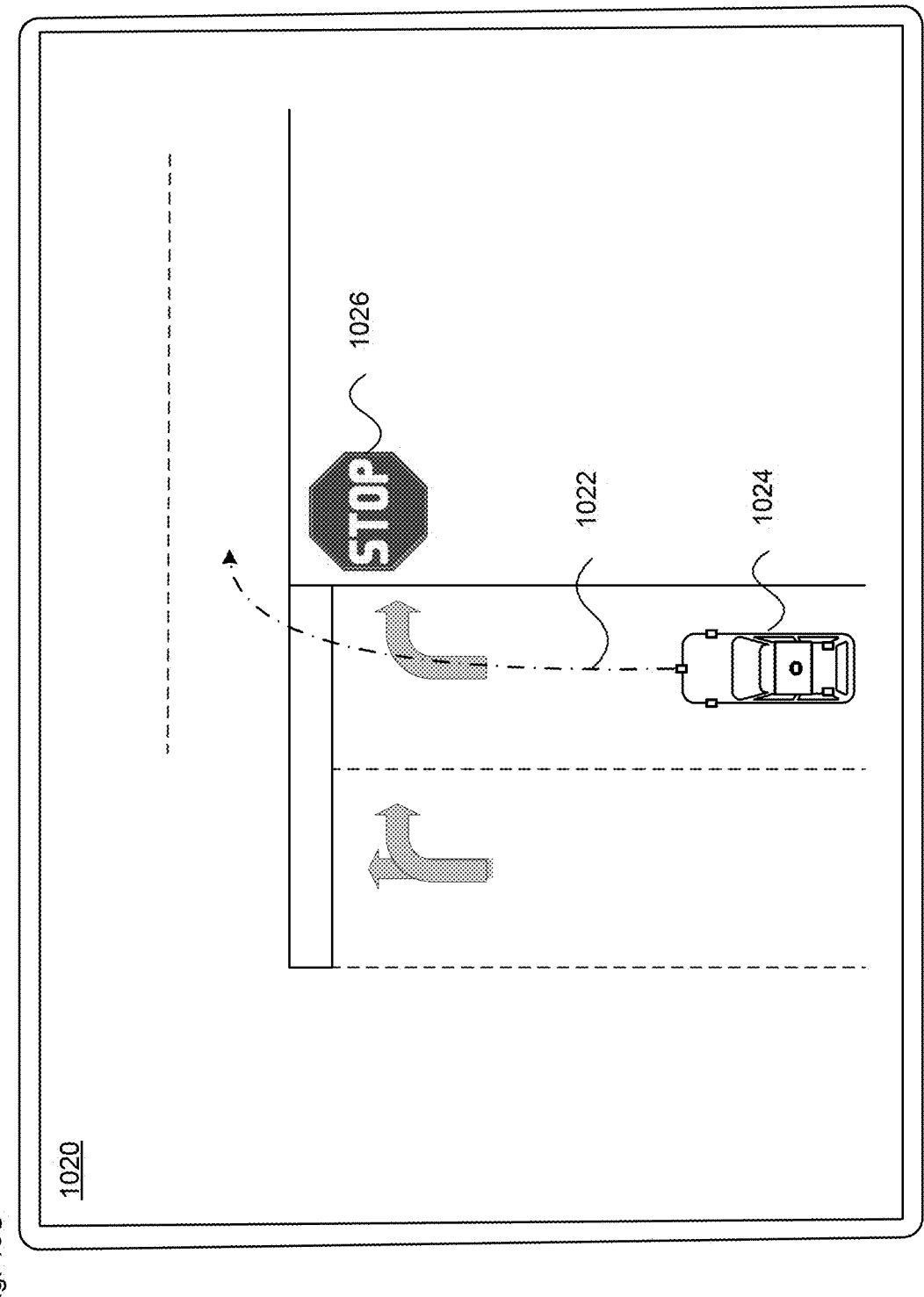
Figure 10D:
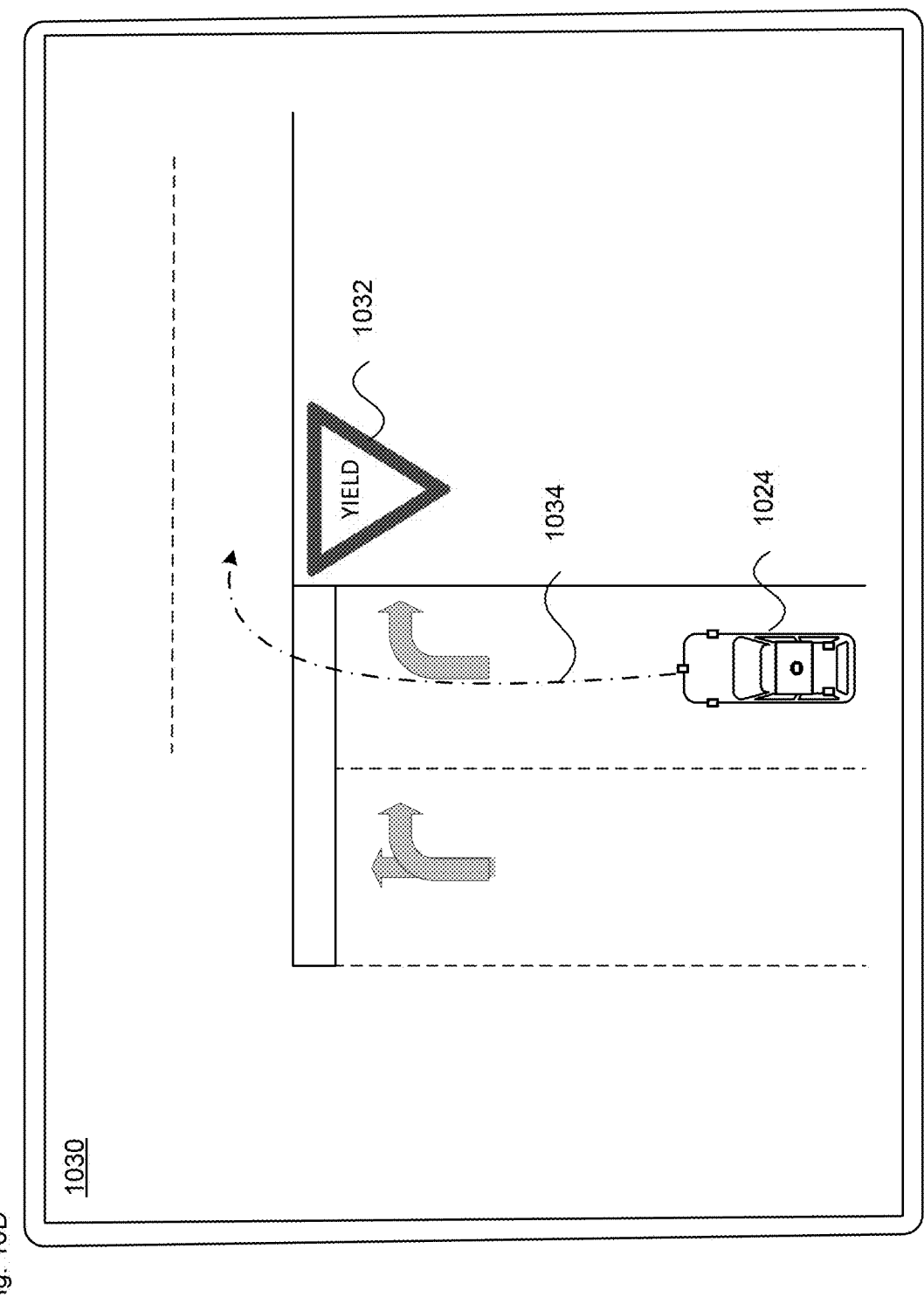

FIGS. 10C-D illustrate another modification situation. Here, as shown in view 1020 of FIG. 10C, the component may be a planner module that determines a trajectory 1022 of a vehicle 1024 from the right lane of a two-lane road segment. In this example, both lanes may permit right turns, with the left lane also permitting vehicles to go straight. However, unlike the scenario of FIG. 10A, there may be a stop sign 1026 placed at the intersection. The UI would render the trajectory on the display to show the vehicle 1024 moving along the trajectory 1022. As shown in view 1030 of FIG. 10D, modification to the snapshot may include changing the stop sign 1026 to a yield sign 1032. In other examples, a light could be modified from being green (or yellow or red) to red (or green or yellow) or yellow (or green or red). In the example of FIG. 10D, when the modified snapshot is executed according to the component module and rendered for display, the person may see a visualization with a changed trajectory 1034 because the vehicle may need not come to a complete stop. The sign type could be varied and/or other objects could be introduced (e.g., to partly obscure the sign), so that the person can evaluate how the vehicle would react to each modified situation.

Figure 11A:
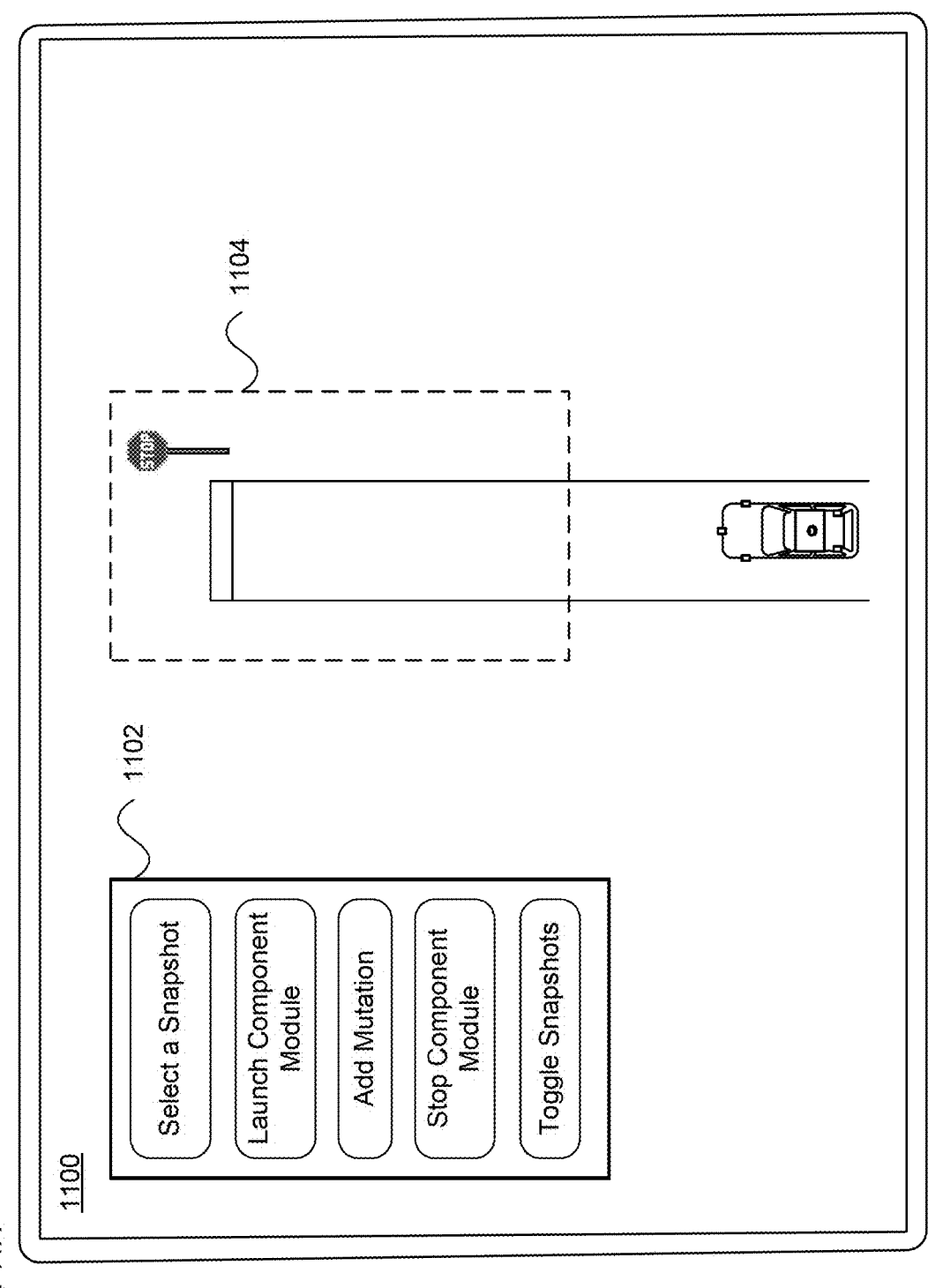
FIGS. 11A-B illustrate a snapshot visualization scenario in accordance with aspects of the technology.
Figure 11B:
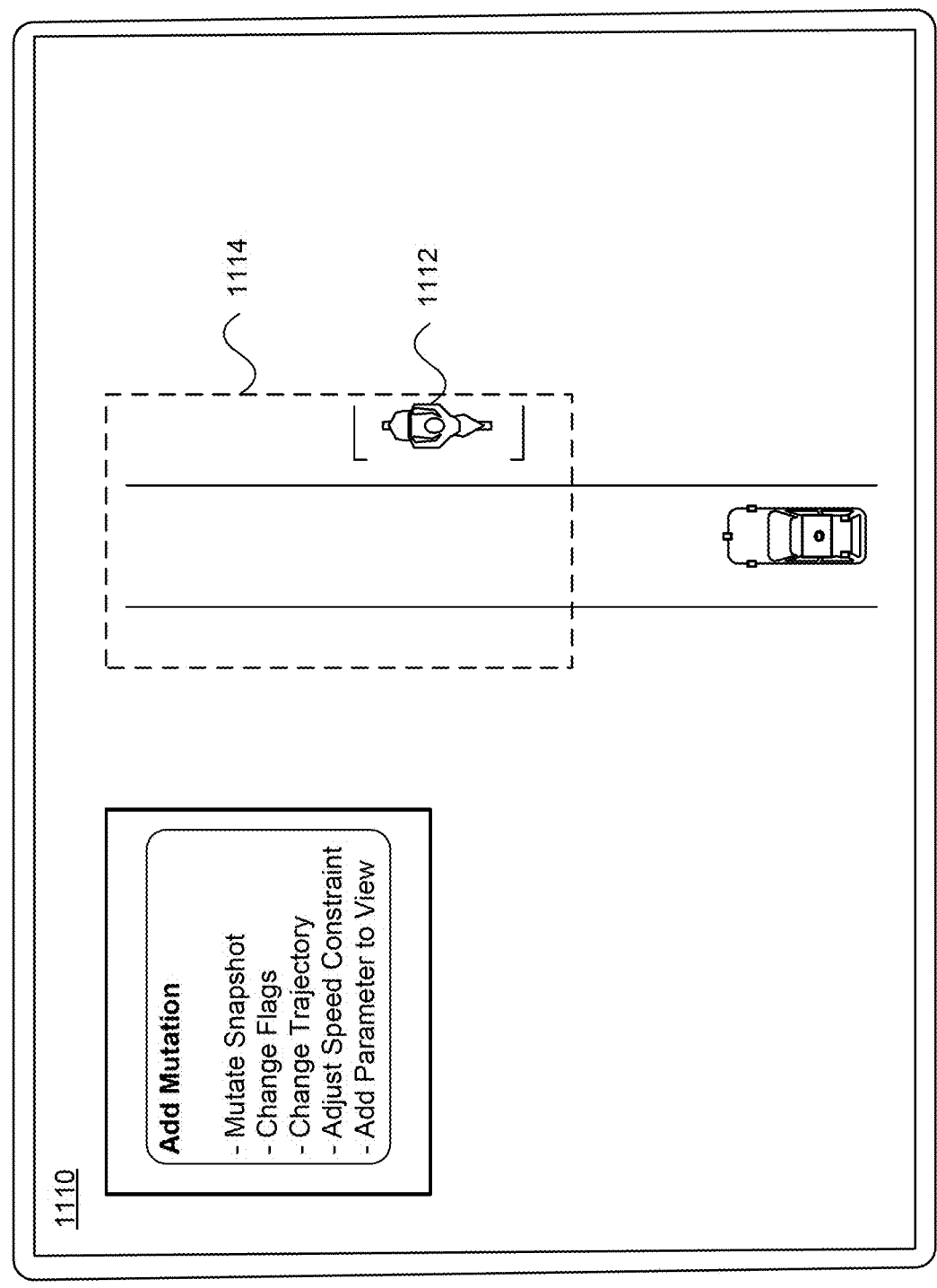

FIG. 11A illustrates an example display configuration 1100. As shown, the display presents a section 1102 with elements to select a snapshot, launch or stop execution of the component module associated with a selected snapshot, as well as to add a mutation to a snapshot. For instance, the user may be evaluating a scenario where a vehicle approaches a stop sign as shown in dashed area 1104. Upon selection of the "Add Mutation" button, as shown in view 1110 of FIG. 11B, the user may change the snapshot scenario to remove the stop sign but add a motorcyclist 1112 positioned in a parking spot on the side of the road as shown in dashed area 1114. Another example mutation is modulating a tuning parameter such as a threshold for go/no go for a yellow light. Other mutations may include selecting a perception object/objects censoring the object(s), modifying a behavior prediction agent's state positions or a behavior prediction likelihood. A behavior prediction is an input provided by a separate process from the system (e.g., behavior prediction module 211b) that comes in the form of a trajectory. The trajectory begins at a perception object's position and extends forward over time, discretized by "agent state positions". Essentially, a series of agent states describe a trajectory of an object that evolves over time. The likelihood is a value accompanying a behavior prediction that indicates how confident the system (e.g., the behavior prediction module) believes the trajectory will be taken by the corresponding perception object. Thus, modifying likelihoods affects the autonomous system's confidence in the trajectory, and modifying agent states affects how the trajectory itself is reacted to by the vehicle. Conditional behavior predictions are yet another example of something that can be mutated. Conditional behavior predictions are similar to behavior predictions as described above, with a difference being that here the behavior prediction is generated conditional to some other future action. This could be something such as "assuming the vehicle turns left, what does the behavior prediction module believe object X's behavior prediction will be. Modifying signals in place is another type of mutation. Signals are an internal output of planning logic produced by earlier components and consumed by downstream components. This can include things such as the available road width for planning, traffic light conditions, road visibility, etc. Modifying these is a more surgical approach to system evaluation as opposed to constructing an input all the way upstream to affect our target piece of code. Instead, here only the signal immediately preceding the input is modified. A further type of mutation involves drawing a target reference path, which can also include either feeding that path to another module for search or optimization scoring, or for producing passing decisions (e.g., the planner module 211a in FIG. 2 deciding whether the vehicle should pass or not pass another road user). Manually creating a path for consumption by other components is similar to a signal mutation as described above. The ability to bypass upstream logic and feed a custom input to a target piece of logic allows more flexibility. In this case overriding a reference path that's passed to a path generator can force the system to evaluate its subsequent decisions conditioned on that reference.

The snapshot could be mutated, flags could be changed, an object's trajectory could be changed, speed constraints could be adjusted, and/or parameters could be added to view in the user interface. Flags are inputs specified at runtime that can affect the software in various ways. For instance, flags can be employed as a mechanism to trigger certain code sections within the software without rebuild/restart. Examples could include "activate experimental lane change algorithm", "adjust distance threshold for cyclist yield", or even "output more debug information" of a certain type. Parameters ultimately have a similar function, but are incorporated as part of the snapshot instead. Parameters can represent variables in the system that are more structured and mature than arbitrary flags. For instance, examples of parameters could be "a set of speed limit constraints for various road types" or "a collection of tuned variables for path optimization". Parameters could be more difficult to experiment with outside of visualization tool discussed herein, because they can affect more widespread parts of a component. By way of example only, the UI may comprise a web-based application that enables a person to configure different snapshot configurations based on a stored baseline snapshot. Once the mutation(s) have been selected, selecting Launch Component Module would create a visualization of the modified snapshot, so that the user could see whether the planner module of the vehicle would modify its autonomous driving with the introduction of the motorcycle and the lack of a stop sign. In one aspect, the UI may include a hotkey to toggle between a modified snapshot overlay and an underlying source snapshot. This enables the user to have the ability to quickly flip back and forth between different variations to compare pixel-by-pixel the differences for better debug capability.

The component module (e.g., 914 in FIG. 9) may function as a software "server" that caches all of the information necessary to execute a snapshot associated with a given component. According to one aspect of the technology, the component module may be a stand-alone binary file (or object code) that can be re-compiled and re-run without affecting operation of the editor module 910 (or other elements of the UI 902). The component module should also be configured so that when it executes, it should take approximately the same amount of time as it would take the component to run during actual vehicle operation. For instance, if a given sub-component of the planner module would typically take milliseconds or tens of milliseconds to execute onboard the vehicle during actual operation, the component module executing the snapshot associated with the given sub-component should not take multiple orders of magnitude more time to run. Also, once a snapshot is run one time, information about that run can be cached so that subsequent runs with modifications may take a minimal amount of time (e.g., tens of milliseconds or a few seconds depending on the complexity of the snapshot). In one scenario, any resource that is time consuming to load, such as a roadgraph, machine learning models, outputs from other onboard components, etc., can be constructed once and kept fresh in the system alongside the snapshot.

Figure 12:
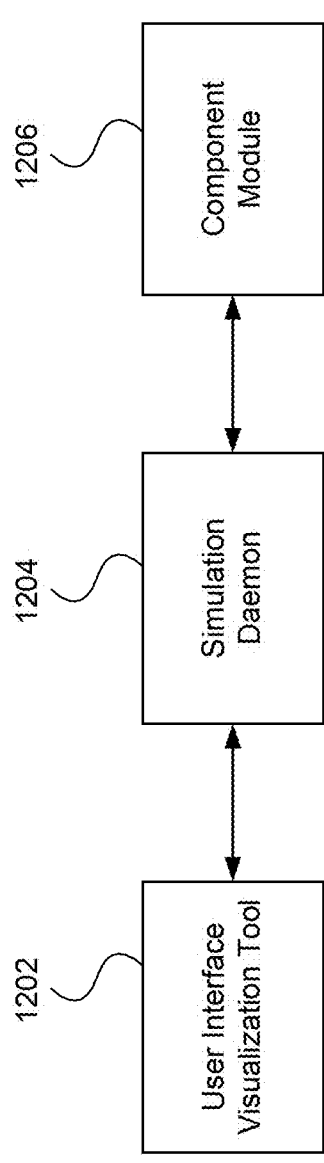
FIG. 12 illustrates visualization elements in accordance with aspects of the technology.

FIG. 12 illustrates an example 1200 of how a visualization tool 1202 of the user interface can interoperate with a component module 1206 via an intermediary simulation daemon 1204. The visualization tool may be a web-based or locally executed application that enables the user to configure different layouts of UI sections (e.g., panels). The UI sections can each provide individual tools for data exploration/evaluation. This can include providing textual information such as log data, as well as charts, graphs and/or 2D or 3D renderings of the vehicle's driving environment.

Upon initiation of a snapshot process, the system may retrieve a log file containing a single frame of data that is loaded by the visualization tool. And once the component module executed the snapshot, it will return a path to the directory containing the log, which can be loaded in the visual tool for presentation to the user on the display.

The simulation daemon 1204 functions as a separate process that serves as an abstraction layer between the user interface visualization tool 1202 and the component module 1206. One benefit of using the simulation daemon 1204 is to avoid direct communication between binaries such as a service (e.g., the user interface visualization tool 1202) with a local process on a workstation (e.g., the component module 1206). However, the simulation daemon 1204 should not cause delays when generating snapshot visualizations.

In one example, the visualization tool can make requests to the simulation daemon through a proxy. The simulation daemon would then spawn or reuse a component module instance based on provided inputs, then forward the requests to the component module. In another example, the proxy can be generalized to spawn binaries other than the simulation daemon, such as the component module. Requests can be made directly to the component module through the proxy, and the proxy would spawn the component module as necessary.

The component module may generate a log and writes it to the file system, which the system then pipes back to WebViz as an additional data source, performed as one asynchronous operation. The file system may comprise a low latency database, for instance one that can retrieve information on the order of tens of milliseconds. In one scenario, database resources may be selected according to user geographic location to further minimize latency, which can shave milliseconds from the retrieval process.

Component module state management may include building, starting up, or actually running the snapshot. Ideally this status is presented to the user. This could be achieved in different ways. One is to make every request a stream and send progress updates through the stream. By way of example, the system may split operations into two handlers, one for kicking off operations and one for querying status. Another approach is to stream data directly to the visualization tool rather than writing to the file system as an intermediate step.

The simulation daemon can be configured to either run locally or in the cloud. The simulation daemon can automatically build/download and run binaries such as for a given component module (e.g., a planner module). This adds a measure of security and reliability, preventing a crash in the component module from affecting the user interface visualization tool (or vice versa) and enabling the system to restart the component module automatically if the user creates a malformed request via the user interface visualization tool. A proxy layer of the simulation daemon can be employed to echo commands from the user interface visualization tool via the simulation daemon to the component module and conversely responses from the component module all the way back to the visualization tool via the simulation daemon.

The simulation daemon may be used when a user requests a simulation from the web (e.g., makes a request to server system 602 and/or storage system 620 via network 616 of FIG. 6), against a specific scenario for example. These requests have a clear start and end: build/download a simulator binary, feed all the simulation and scenario parameters, run the binary, save outputs and terminate. According to one aspect of the technology, the component module does not terminate. Rather, it stays running in order to continue serving simulation requests, such as modifications to the snapshot, near-instantly (e.g., within milliseconds or tens of milliseconds. In a conventional approach, the build/download phase is unavoidably a minutes-long process at best, sometimes tens of minutes. In contrast to that, once built and loaded, an offline snapshot simulation implemented as described above (e.g., using snapshot evaluator 606 of FIG. 6) is almost as fast as the component module would be running in real time on a vehicle operating in an autonomous mode, whereas a conventional full simulation could take upwards of a half hour or more. Thus, this approach removes latency that can affect testing and simulation while integrating with production services and resources in a scalable way. In this way, the person running simulations or otherwise modifying snapshots can make the desired changes to the snapshot(s) and see the visualization in the UI within a few seconds, such as on the order of 1-2 seconds or less. In addition to efficient use of computing resources, this real-time visualization approach enables users to make many changes quickly, promoting testability and generally improving the component evaluation process.

FIG. 13 illustrates an example 1300 of a method in accordance with the above-described features, in particular a method for evaluating a component of a vehicle configured to operate in an autonomous driving mode. At block 1302, the method includes retrieving a snapshot from a database. The snapshot includes a set of state information that is a minimal amount of information needed to recreate an action or a state of the component at a particular point in time when operating in the autonomous driving mode. At least a portion of the state information has been serialized. At block 1304, the method includes performing a deserializing operation on the serialized portion of the state information. At block 1306, user input is received that indicates a request to visualize the snapshot. The request includes at least one of selection of the snapshot, mutating a feature of the snapshot, or toggling between versions of the snapshot. At block 1308, in response to the request, the method includes performing an evaluation of the snapshot to identify either the state of the component or an output of the component at the particular point in time. And at block 1310 the method includes generating, for display on a display device, a visualization of the snapshot as the evaluation is being performed. The visualization indicates the state of the component or the output of the component at the particular point in time.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A method for evaluating a component of a vehicle configured to operate in an autonomous driving mode, the method comprising:

retrieving from a database, by one or more processors,—a snapshot associated with the component and including a set of state information, the set of state information comprising a minimal amount of information needed to recreate an action or a state of the component at a particular point in time, and wherein at least a portion of the set of state information is stored in a serialized format;

performing, by the one or more processors, a deserializing operation on the portion of the set of-state information to yield a deserialized portion of the set of state information;

receiving, by the one or more processors, user input indicating a request to visualize the snapshot, the request including mutating a feature of the snapshot, the mutating including modifying a property of an object in an environment of the vehicle;

in response to the request, identifying, by the one or more processors based at least on the deserialized portion of the set of state information, either the state of the component or an output of the component at the particular point in time, the identifying including initializing internal structures of the component in accordance with mutating the feature; and in according with the identifying, generating, by the one or more processors for display on a display device, a visualization of the snapshot, the visualization indicating the state of the component or the output of the component.

2. The method of claim 1, wherein identifying either the state of the component or the output of the component includes initializing internal structures of the component so that they are equivalent to how the internal structures were at generation of the snapshot.

3. The method of claim 2, wherein the internal structures are initialized based on one or more cached resources maintained separately from the snapshot.

4. The method of claim 3, wherein the one or more cached resources include at least one of a roadgraph, a machine learning model, or an output from another component of the vehicle.

5. The method of claim 1, wherein mutating the feature includes either adding or removing another object in the environment of the vehicle.

6. The method of claim 1, wherein mutating the feature further includes modulating a tuning parameter associated with operating the vehicle in the autonomous driving mode.

7. The method of claim 1, wherein mutating the feature further includes modifying one or more aspects of a behavior prediction for an agent, the one or more aspects including at least one of state positions of the agent or a behavior prediction likelihood.

8. The method of claim 7, wherein the behavior prediction is conditional to a future action.

9. The method of claim 1, wherein mutating the feature further includes selecting a target reference path.

10. The method of claim 1, wherein identifying either the state of the component or the output of the component includes analyzing any flags specified at runtime for the snapshot.

11. The method of claim 1, further comprising, in response to the user input, performing a toggle operation between two or more versions of the snapshot.

12. The method of claim 1, further comprising storing the visualization of the snapshot in the database.

13. The method of claim 1, further comprising, in response to the user input, generating a set of mutated snapshots, each mutated snapshot in the set having a different group of features.

14. A processing system, comprising:

memory configured to store a snapshot, the snapshot being associated with a component of a vehicle and capturing a set of inputs necessary to run the component in order to identify either a state of the component or an output of the component at a particular point in time, the vehicle being configured to operate in an autonomous driving mode; and one or more processors operatively coupled to the memory, the one or more processors being configured to:

retrieve the snapshot from the memory, the snapshot including a set of state information, the set of state information comprising a minimal amount of information needed to recreate an action or the state of the component at the particular point in time, and wherein at least a portion of the set of state information is stored in the memory in a serialized format;

perform a deserializing operation on the portion of the set of state information to yield a deserialized portion of the set of state information;

receive user input indicating a request to visualize the snapshot, the request including mutating a feature of the snapshot, the mutating including modulating a tuning parameter associated with operating the vehicle in the autonomous driving mode;

in response to the request, identify, based at least on the deserialized portion of the set of state information, either the state of the component or the output of the component at the particular point in time, the identifying including initializing internal structures of the component in accordance with mutating the feature; and in according with the identification, generate, for display on a display device, a visualization of the snapshot, the visualization indicating the state of the component or the output of the component.

15. The processing system of claim 14, wherein the one or more processors are further configured to cache information about the snapshot in order to either reduce an amount of time to evaluate modified versions of the snapshot or generate visualizations of the modified versions of the snapshot.

16. A method for evaluating a component of a vehicle configured to operate in an autonomous driving mode, the method comprising:

retrieving from a database, by one or more processors, —a snapshot associated with the component and including a set of state information, the set of state information comprising a minimal amount of information needed to recreate an action or a state of the component at a particular point in time, and wherein at least a portion of the set of state information is stored in a serialized format;

performing, by the one or more processors, a deserializing operation on the portion of the set of-state information to yield a deserialized portion of the set of state information;

receiving, by the one or more processors, user input indicating a request to visualize the snapshot, the request including mutating a feature of the snapshot, the mutating including selecting a target reference path;

in response to the request, identifying, by the one or more processors based at least on the deserialized portion of the set of state information, either the state of the component or an output of the component at the particular point in time, the identifying including initializing internal structures of the component in accordance with mutating the feature; and in according with the identifying, generating, by the one or more processors for display on a display device, a visualization of the snapshot, the visualization indicating the state of the component or the output of the component.

17. A method for evaluating a component of a vehicle configured to operate in an autonomous driving mode, the method comprising:

retrieving from a database, by one or more processors,—a snapshot associated with the component and including a set of state information, the set of state information comprising a minimal amount of information needed to recreate an action or a state of the component at a particular point in time, and wherein at least a portion of the set of state information is stored in a serialized format;

performing, by the one or more processors, a deserializing operation on the portion of the set of-state information to yield a deserialized portion of the set of state information;

receiving, by the one or more processors, user input indicating a request to visualize the snapshot, the request including at least one of selection of the snapshot, mutating a feature of the snapshot, or toggling between two or more versions of the snapshot;

in response to the request, identifying, by the one or more processors based at least on the deserialized portion of the set of state information, either the state of the component or an output of the component at the particular point in time;

in according with the identifying, generating, by the one or more processors for display on a display device, a visualization of the snapshot, the visualization indicating the state of the component or the output of the component; and in response to the user input, generating a set of mutated snapshots, each mutated snapshot in the set having a different group of features.

* * * * *